(12) United States Patent
Sterling et al.

(10) Patent No.: US 11,124,925 B2
(45) Date of Patent: Sep. 21, 2021

(54) CRANE MAT AND METHOD OF MANUFACTURE

(71) Applicant: Sterling Site Access Solutions, LLC, Phoenix, IL (US)

(72) Inventors: Carter Sterling, Palos Park, IL (US); Cooper Sterling, Palos Park, IL (US); Michael O'Connell, Naperville, IL (US); Christian Sterling, Palos Heights, IL (US); Carson Sterling, Valparaiso, IN (US); John Sterling, Palos Park, IL (US); John Rake, Chicago, IL (US)

(73) Assignee: Sterling Site Access Solutions, LLC, Phoenix, IL (US)

( * ) Notice: Subject to any disclaimer, the term of this patent is extended or adjusted under 35 U.S.C. 154(b) by 0 days.

(21) Appl. No.: 16/778,602

(22) Filed: Jan. 31, 2020

(65) Prior Publication Data

US 2020/0165783 A1    May 28, 2020

Related U.S. Application Data

(60) Division of application No. 15/428,053, filed on Feb. 8, 2017, now Pat. No. 10,577,753, which is a
(Continued)

(51) Int. Cl.
*E01C 9/00* (2006.01)
*E01C 5/00* (2006.01)
(Continued)

(52) U.S. Cl.
CPC .............. *E01C 9/086* (2013.01); *B32B 7/12* (2013.01); *B32B 21/042* (2013.01); *B32B 21/13* (2013.01);
(Continued)

(58) Field of Classification Search
CPC ..... E01C 5/00; E01C 5/10; E01C 5/14; E01C 9/00; E01C 9/08; E01C 9/086; B32B 7/00;
(Continued)

(56) References Cited

U.S. PATENT DOCUMENTS 1,465,383 A * 8/1923 Walsh ...................... B27M 1/02
                                                          428/106
2,335,556 A    11/1943 Wilson
(Continued)

FOREIGN PATENT DOCUMENTS

CA         2462302 C      8/2005
CA         2557701 A1     2/2008
(Continued)

OTHER PUBLICATIONS

PCT Application No. PCT/US2017/017057, International Preliminary Report on Patentability dated Aug. 22, 2019, 12 pages.
(Continued)

*Primary Examiner* — Jacob T Minskey
*Assistant Examiner* — Matthew Hoover
(74) *Attorney, Agent, or Firm* — Vedder Price P.C.

(57) ABSTRACT

A crane mat is disclosed having a plurality of panels of lumber positioned in alternating transverse directions with respect to one another, where the top and bottom panels are oriented parallel to the direction of vehicular traffic. The top and bottom panels may include a plurality of spaced apart grooves extending longitudinally from a first longitudinal end of the crane mat to a second longitudinal end of the crane mat for enhancing traction of a vehicle when traversing across the crane mat by transporting rain or moisture off the mat, or for receiving mud or other debris. The crane mat may include a plurality of edge protectors positioned on respective sides of the crane mat to protect the crane mat
(Continued)

from handling damage. In various embodiments, the crane mat may be manufactured using either softwood, hardwood, or any combination of softwood and hardwood.

27 Claims, 20 Drawing Sheets

Related U.S. Application Data continuation-in-part of application No. 14/932,329, filed on Nov. 4, 2015, now abandoned.

(60) Provisional application No. 62/200,508, filed on Aug. 3, 2015, provisional application No. 62/211,651, filed on Aug. 28, 2015.

(51) Int. Cl.

| | | |
|---|---|---|
| *B32B 7/00* | (2019.01) | |
| *B32B 21/00* | (2006.01) | |
| *B32B 37/00* | (2006.01) | |
| *B32B 38/00* | (2006.01) | |
| *B66C 23/00* | (2006.01) | |
| *E01C 9/08* | (2006.01) | |
| *E01C 5/14* | (2006.01) | |
| *B32B 7/12* | (2006.01) | |
| *B32B 21/04* | (2006.01) | |
| *B32B 21/13* | (2006.01) | |
| *B32B 37/12* | (2006.01) | |
| *B32B 37/18* | (2006.01) | |
| *B32B 37/02* | (2006.01) | |
| *B66C 23/78* | (2006.01) | |
| *E01C 9/02* | (2006.01) | |

(52) U.S. Cl.
CPC .............. *B32B 37/02* (2013.01); *B32B 37/12* (2013.01); *B32B 37/18* (2013.01); *B32B 38/0004* (2013.01); *B66C 23/78* (2013.01); *E01C 5/14* (2013.01); *E01C 9/02* (2013.01); *B32B 2317/16* (2013.01)

(58) Field of Classification Search
CPC .. B32B 7/10; B32B 7/12; B32B 21/00; B32B 21/04; B32B 21/042; B32B 21/10; B32B 21/13; B32B 37/00; B32B 37/02; B32B 37/10; B32B 37/12; B32B 37/18; B32B 38/00; B32B 38/0004; B66C 23/00; B66C 23/70; B66C 23/78
See application file for complete search history.

(56) References Cited

U.S. PATENT DOCUMENTS

| | | | |
|---|---|---|---|
| 2,402,090 | A | 6/1946 | Ruppel |
| 3,722,563 | A | 3/1973 | Schober |
| 3,730,820 | A | 5/1973 | Fields et al. |
| 3,482,044 | A | 1/1974 | Olin |
| 4,289,420 | A | 9/1981 | Davis et al. |
| 4,364,984 | A | 12/1982 | Wentworth |
| 4,446,712 | A | 5/1984 | Stone et al. |
| 4,600,336 | A | 7/1986 | Waller |
| 4,600,337 | A | 7/1986 | Sarver |
| 4,664,818 | A | 5/1987 | Halliday et al. |
| 4,875,800 | A * | 10/1989 | Hicks ........................ E01C 5/14 404/35 |
| 4,922,598 | A | 5/1990 | Pouyer |
| 5,032,037 | A | 7/1991 | Phillips et al. |
| 5,087,149 | A | 2/1992 | Waller |
| 5,163,776 | A | 11/1992 | Pouyer |
| 5,201,601 | A | 4/1993 | Stanley et al. |
| 5,234,204 | A | 8/1993 | Hunt |
| 5,316,408 | A | 5/1994 | Stanley et al. |
| 5,653,551 | A | 8/1997 | Seaux |
| 5,822,944 | A | 10/1998 | Penland |
| 5,885,685 | A | 3/1999 | Tingley |
| 5,967,694 | A | 10/1999 | Dovarrubias et al. |
| 6,214,428 | B1 | 4/2001 | Henderson |
| 6,455,127 | B1 | 9/2002 | Valtanen |
| 6,474,905 | B1 | 11/2002 | Smith et al. |
| 6,558,766 | B2 | 5/2003 | Padmanabhan et al. |
| 6,745,452 | B1 | 6/2004 | Harrison |
| 7,210,211 | B2 | 5/2007 | Harrison |
| 7,427,172 | B2 | 9/2008 | Lukasik |
| 7,611,260 | B1 | 11/2009 | Lin et al. |
| 7,818,929 | B2 | 10/2010 | Fiutak et al. |
| 7,934,885 | B2 | 5/2011 | Fournier |
| 8,066,447 | B2 | 11/2011 | Brandstrom |
| 8,096,728 | B2 | 1/2012 | Stasiewich et al. |
| 8,382,393 | B1 | 2/2013 | Phillips |
| 8,403,593 | B2 | 3/2013 | Dagesse |
| 8,485,754 | B2 | 7/2013 | Bathelt |
| 8,906,480 | B2 | 12/2014 | Fiutak et al. |
| 8,927,085 | B2 | 1/2015 | Burton |
| 9,011,037 | B2 | 4/2015 | Breault |
| 9,068,434 | B1 * | 6/2015 | Phillips ..................... E01C 5/22 |
| 2004/0223828 | A1 | 11/2004 | Lazaruk et al. |
| 2007/0056228 | A1 | 3/2007 | Penland et al. |
| 2008/0193213 | A1 | 8/2008 | Harrison |
| 2009/0113838 | A1 | 5/2009 | Paulsen et al. |
| 2011/0250014 | A1 | 10/2011 | Corser |
| 2011/0299923 | A1 | 12/2011 | Bleile et al. |
| 2012/0063844 | A1 | 3/2012 | Wold |
| 2013/0078041 | A1 | 3/2013 | Price |
| 2013/0170907 | A1 | 7/2013 | Gunn |
| 2013/0264773 | A1 | 10/2013 | McDowell |
| 2013/0284872 | A1 | 10/2013 | Tubbs |
| 2014/0189985 | A1 | 7/2014 | McDowell et al. |
| 2014/0193196 | A1 | 7/2014 | Fournier |
| 2014/0341649 | A1 * | 11/2014 | Bryan ................... F16B 37/145 404/35 |
| 2016/0356124 | A1 | 12/2016 | Ingalls |

FOREIGN PATENT DOCUMENTS

| | | | |
|---|---|---|---|
| CA | 2788093 | A1 | 8/2011 |
| CA | 2699910 | A1 | 10/2011 |
| EP | 113661 | A2 | 7/1984 |
| EP | 1845195 | A2 | 10/2007 |
| WO | 200805100 | A2 | 4/2008 |
| WO | 2009058514 | A1 | 5/2009 |
| WO | 2011137537 | A1 | 11/2011 |
| WO | 2012145490 | A1 | 10/2012 |
| WO | 2014194238 | A1 | 4/2014 |
| WO | 2014164070 | A2 | 10/2014 |

OTHER PUBLICATIONS

EP15900604.8 Extended European Search Report dated Dec. 13, 2018; 10 pages.
International Search Report and Written Opinion dated Apr. 27, 2017 from International Application No. PCT/US2017/017057 (14 pages).
Cross Laminated timber LCBT Gateway Animation (LCBT Gateway) Oct. 1, 2013. Retrieved from the Internet on Apr. 5, 2017. URL: <https://www.youtube.com/watch?v=4VvRvuT1LXw> (7 pages).
Complete production line for Cross Laminated Timber CLT by Ledinek (Ledinek) Nov. 24, 2016; Retrieved from the Internet on Apr. 5, 2017. URL: <https://www.youtube.com/watch?v=jokkciSTtM74> (21 pages).
Laminating Index Station—Black Bros. Co. (Black Bros.) Aug. 2, 2012; Retrieved from the Internet on Apr. 5, 2017. URL: <https://www.youtube.com/watch?v=DTJG1Y1eYzA> (3 pages).
Buy Direct from Manufacturer Lower Cost & Higher Quality (Sterling) May 20, 2016; Retrieved from the Internet on Apr. 5, 2017; URL: <https://web-beta.archive.org/web/20160520035641/http://www.sterlingcranemats.com/products/terralamtm-clt-mats/cit-500-series-mat> (6 pages).

(56) References Cited

OTHER PUBLICATIONS

CLT production line from Kallesoe Machinery (Kallesoe) Apr. 15, 2015; Retrieved from the Internet on Apr. 5, 2017. URL: <https://www.youtube.com/watch?v=Bik1Sh6F1wo> (10 pages).
What is Cross Laminated Timber?(XLAM) Nov. 15, 2016; Retrieved from the Internet on Apr. 5, 2017. URL: <https://web-beta.archieve.org/web/20161115141418/http://www.xlam.co.nz/xiam-cit.html> (7 pages).
Landing Mats for Boat Ramp, Calumet Industries, calumetlindustries.com/ Accessed: Jun. 2015. http://www.calumetlindustries.com/?=mats, 5 pages.
3-PLY timber Mats, Matras®—One size does not fit all, matraxinc.com, Accessed: Jun. 2015. http://matraxinc.com/construction-matting-portable-roads/limber-mats-2/, 2 pages.
Laminated Mats, Pipeline Skid Service, pipelineskidservice.com/ 2008. http://www.pipelineskidservice.com/laminated_Mats.php, 2 pages.
International Search Report, dated Jan. 27, 2016 from corresponding International Application No. PCT/US2015/058990, 16 pages.
Access Mat 3 Ply Video Final, Sterling Lumber. Youtube. Apr. 21, 2014. [retrieved Dec. 27, 2015]. Retrieved via the internet:, <URL: https:1www.youtube.com/watch?v-ZVRyZIOf05E>, Examiner-Referenced Figures 1-4, 4 pages.
Rig Mat Systems—Access Mats, Rig Mat Systems, Accessed: Sep. 16, 2013. http://rigmatsystems.com/access-mats/, 2 pages.
Rig Mat Systems—Home, Rig Mat Systems, Accessed: Sep. 16, 2013. http://rigmatsystems.com/, 1 page.
Rig Mat Systems—Details, Rig Mat Systems, Accessed: Sep. 16, 2013. http://rigmatsystems.com/Rig-Mats_delails_9-16/2013.pdf, 1 page.
3 Ply Laminated Construction Mats, Temporary Roadways, Swamp Mats; Quality Mat Company, Accessed: Sep. 16, 2013. http://www.qmat.com/threeplylaminated-mats.asp, 1 page.
Carolina Mat Incorporated—Laminated Mats, Construction Mats, Log Mats, Crane Mats, Plynouth Carolina Mat Incorporated, Accessed: Sep. 16, 2013. http://www.carolinamat.com/Mal%20Designs.hlm, 3 pages.
The World's Leading Producer of Hardwood Mats, Crane Mats, Draglne Mats, Timber Mats, Laminated Mats, Bridge Mats, and Full Sawn Skids—Dixie Mat, p. 1; DixieMat, Accessed: Sep. 16, 2013. http://www.dixiemat.com/products-laminatedmats.php, 1 page.
The World's Leading Producer of Hardwood Mats, Crane Mats, Draglne Mais, Timber Mais, Laminated Mais, Bridge Mais, and Full Sawn Skids—Dixie Mal, p. 2; DixieMal, Accessed: Sep. 16, 2013. http://www.dixiemal.com/products-laminaledmats.php, 1 page.
The World's Leading Producer of Hardwood Mats, Crane Mats, Draglne Mats, Timber Mats, Laminated Mats, Bridge Mats, and Full Sawn Skids—Dixie Mat, p. 3, DixieMat, Accessed: Sep. 16, 2013. http://www.dixiemat.com/products-laminatedmats.php, 1 page.
NorWest Mats | Access mats, Wood Mats, Boiled Mats and Swamp Mait, NorWest Mats, Accessed: Sep. 16, 2013. http://www.norwestmats.com/, 2 pages.
Products—NorWest Industrial Mats | NorWest Mats; NorWest Mats, Accessed: Sep. 16, 2013. http://www.norwestmats.com/products, 4 pages.
ProductDetail, Strad Energy, Accessed: Sep. 16, 2013. http://www.stradenergy.com/Our-Solutions/Matting/29/Wood-Malt, 2 pages.
Swampmats—Mats; Swamp Mats, Accessed: Sep. 16, 2013. http://www.swampmats.ca/index.php/main/content_page/69, 1 page.
Swampmats—Manufacturing; Swamp Mats, Accessed: Sep. 16, 2013. http://www.swampmats.ca/index.php/main/content_page/70, 1 page.
CLT Products—SmartLAM Technologies Group, SmartLAM Technologies Group, Accessed: Sep. 16, 2013. http://smartlamgroup.com/wordpress_1/?page_id=75, 2 pages.
Matting—SmartLAM Technologies Group; SmartLAM Technologies Group, Accessed: Sep. 16, 2013. http://smartlamgroup.com/wordpress_1/?page_id=73, 3 pages.

* cited by examiner

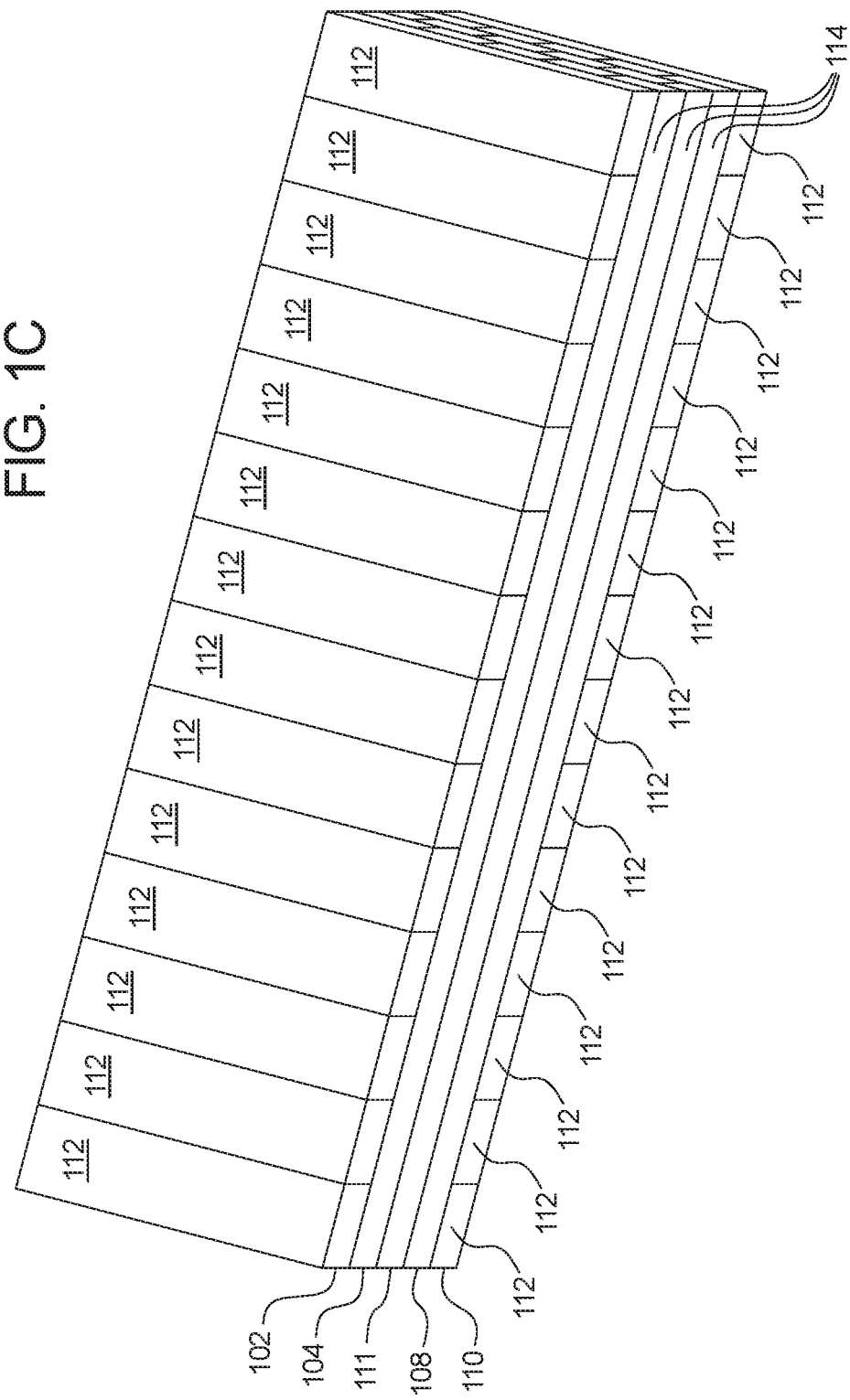

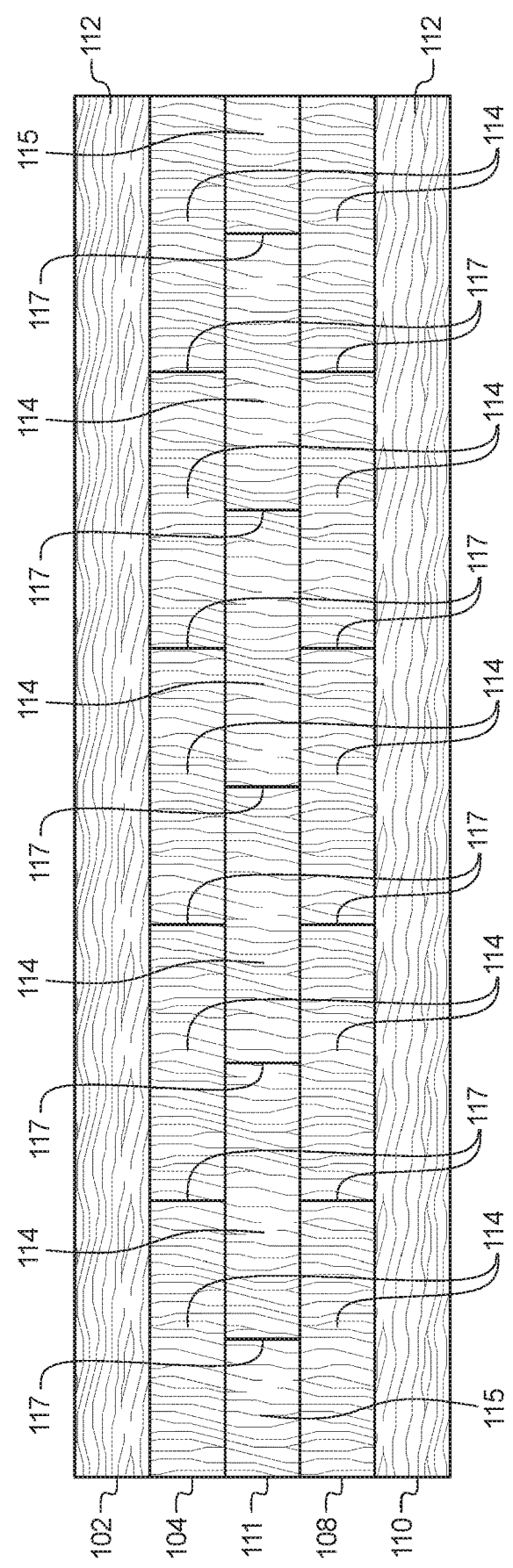

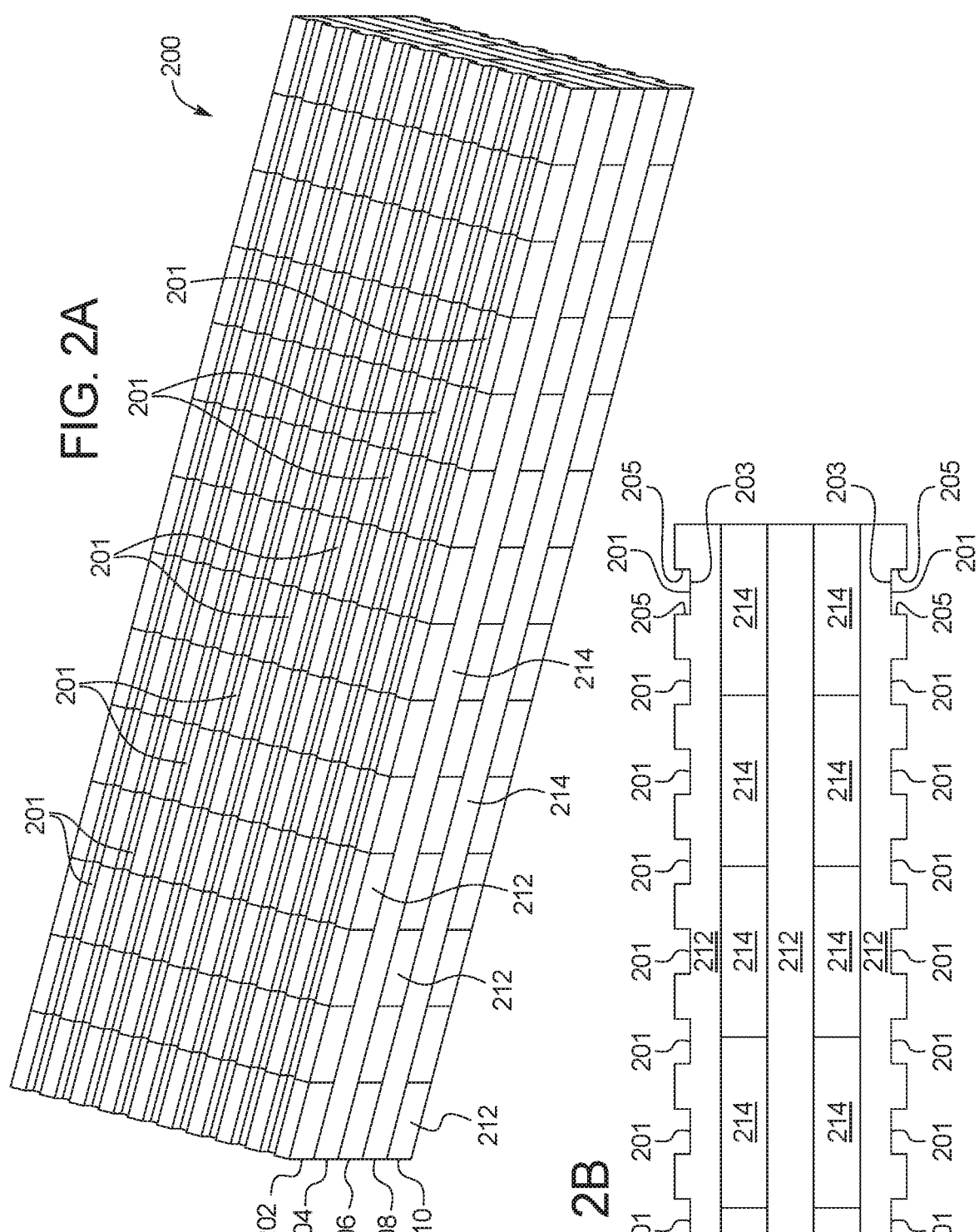

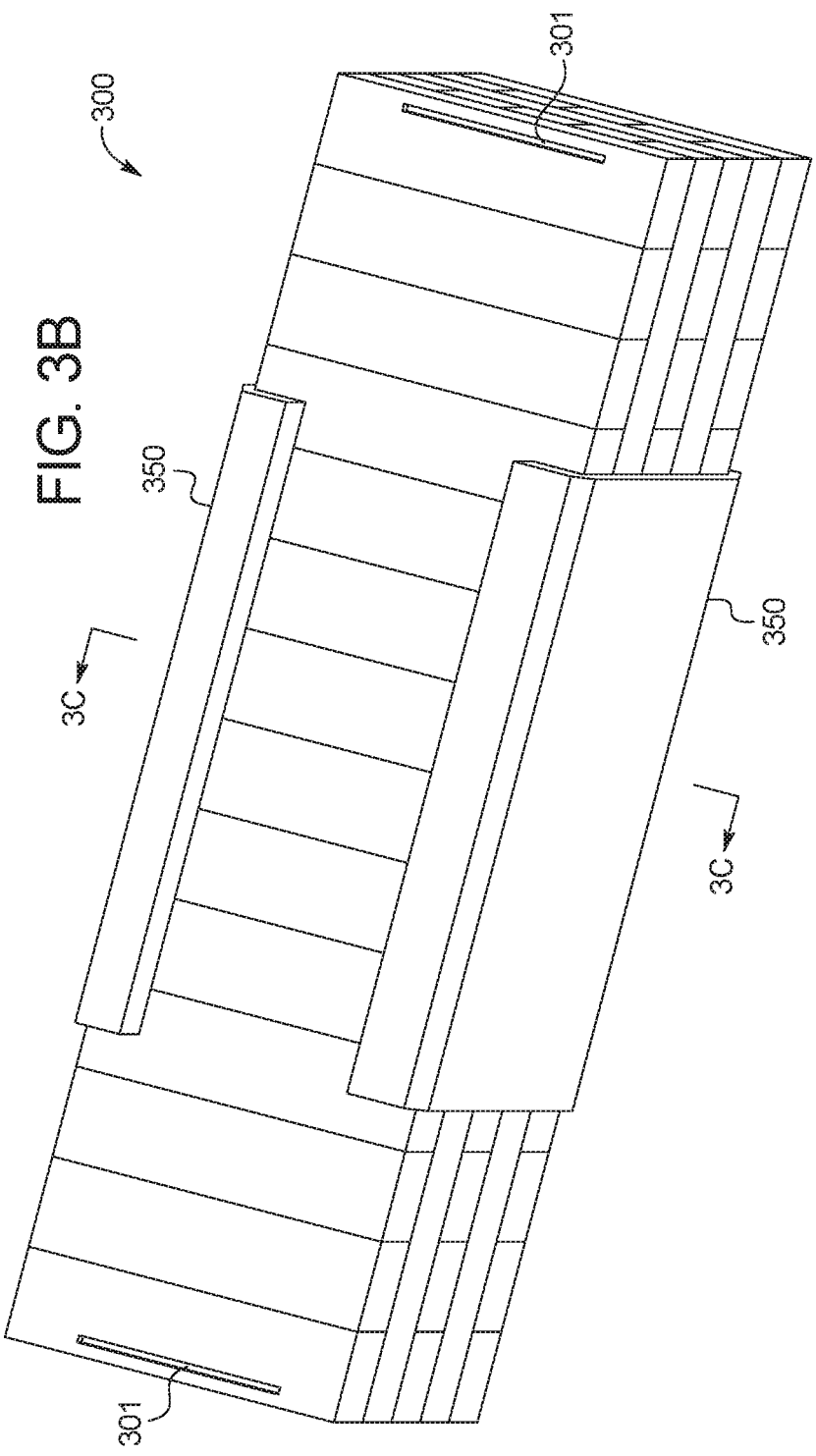

CRANE MAT AND METHOD OF MANUFACTURE

CROSS-REFERENCE TO RELATED APPLICATIONS

This application is a divisional of U.S. patent application Ser. No. 15/428,053, filed Feb. 8, 2017, which is a continuation-in-part of U.S. patent application Ser. No. 14/932,329, filed Nov. 4, 2015, which claims the benefit of U.S. Provisional Application No. 62/200,508, filed Aug. 3, 2015, and U.S. Provisional Application No. 62/211,651, filed Aug. 28, 2015. All of these applications are incorporated by reference herein in their entirety.

BACKGROUND

This application relates generally to the field of temporary roadways and/or ground protection, and more particularly to crane mats and methods and systems for their manufacture.

SUMMARY

An embodiment of a crane mat is disclosed comprising a plurality of panels positioned in alternating transverse directions with respect to one another. Each of the panels is laminated to an adjacent one of the panels, and each of the panels comprise a plurality of lumber members positioned sided by side. The plurality of lumber members of each panel are oriented in either a longitudinal direction or a transverse direction of the crane mat. The plurality of lumber members in a top panel and a bottom panel of the crane mat are oriented in the transverse direction, which is parallel to a direction of travel of vehicular traffic thereon. In some embodiments, the top and bottom panels include a plurality of spaced apart grooves extending longitudinally from a first longitudinal end of the crane mat to a second longitudinal end of the crane mat for enhancing traction of a vehicle when traversing across the crane mat. The plurality of grooves are positioned longitudinally along a portion of the top and bottom panels of the crane mat. In some embodiments, the crane mat includes an edge protector removably positioned along at least a portion of respective longitudinal sides of the crane mat. The edge protector includes a U-shaped cross section and a plurality of longitudinal protrusions engaging a plurality of grooves in the top and bottom panels.

The plurality of panels may include a softwood species, a hardwood species, or any combination of the softwood and the hardwood species. At least one of the plurality of lumber members in the top and bottom panels may include a hardwood species. At least one of the plurality of lumber members in at least one of the panels positioned between the top and bottom panels may include a softwood species. The hardwood species may include at least one of oak, maple, hickory, hackberry, and cherry, and the softwood species may include at least one of spruce, pine, fir, southern yellow pine, and hemlock.

The plurality of lumber members in at least one of the panels may include a plurality of different widths of lumber positioned side-by-side. At least one of the plurality of lumber members may include a plurality of wooden members fingerjointed together.

The spaced apart grooves in the top and bottom panels may comprise a depth up to at least approximately one half of a thickness of a respective one of the top and bottom panel. The depth of the spaced apart grooves may vary from the first longitudinal end of the crane mat to the second longitudinal end of the crane mat. At least one of the spaced apart grooves comprises a depth that may vary from the first longitudinal end of the crane mat to the second longitudinal end of the crane mat.

The edge protector may include a plastic. The edge protector may include a chamfer positioned along top and bottom longitudinal edges. Each of the longitudinal protrusions of the edge protector may include a trapezoidal cross section to ease installation and removal of the edge protector on the top and bottom panels of the crane mat.

Another embodiment of a crane mat having a longitudinal length is disclosed, including: (a) a first panel comprising a plurality of lumber positioned side by side, the plurality of lumber oriented transverse to the longitudinal length of the crane mat, (b) a second panel positioned on top of the first panel, the second panel comprising a plurality of lumber positioned side by side and transverse to the plurality of lumber of the first panel, the second panel being glued to the first panel, (c) a third panel positioned on top of the second panel, the third panel comprising a plurality of lumber positioned side by side and transverse to the plurality of lumber of the second panel, the third panel being glued to the second panel, (d) a fourth panel positioned on top of the third panel, the fourth panel comprising a plurality of lumber positioned side by side and transverse to the plurality of lumber of the third panel, the fourth panel being glued to the third panel, and (e) a fifth panel positioned on top of the fourth panel, the fifth panel comprising a plurality of lumber positioned side by side and transverse to the plurality of lumber of the fourth panel, the fifth panel being glued to the fourth panel.

Another embodiment of a crane mat having a longitudinal length is disclosed, including: (a) a first panel comprising a plurality of lumber positioned side by side, the plurality of lumber oriented transverse to the longitudinal length of the crane mat, (b) a second panel positioned on top of the first panel, the second panel comprising a plurality of lumber positioned side by side and transverse to the plurality of lumber of the first panel, the second panel being glued to the first panel, (c) a third panel positioned on top of the second panel, the third panel comprising a plurality of lumber positioned side by side and transverse to the plurality of lumber of the second panel, the third panel being glued to the second panel, (d) a fourth panel positioned on top of the third panel, the fourth panel comprising a plurality of lumber positioned side by side and transverse to the plurality of lumber of the third panel, the fourth panel being glued to the third panel, and (e) a fifth panel positioned on top of the fourth panel, the fifth panel comprising a plurality of lumber positioned side by side and transverse to the plurality of lumber of the fourth panel, the fifth panel being glued to the fourth panel. In this embodiment, the first and fifth panels include a plurality of spaced apart grooves extending longitudinally from a first longitudinal end of the crane mat to a second longitudinal end of the crane mat for transporting rain or moisture, or for receiving mud or other debris therein.

Another embodiment of a crane mat having a longitudinal length is disclosed, including: (a) a first panel comprising a plurality of lumber positioned side by side, the plurality of lumber oriented transverse to the longitudinal length of the crane mat, (b) a second panel positioned on top of the first panel, the second panel comprising a plurality of lumber positioned side by side and transverse to the plurality of lumber of the first panel, the second panel being glued to the first panel; (c) a third panel positioned on top of the second panel, the third panel comprising a plurality of lumber positioned side by side and transverse to the plurality of lumber of the second panel, the third panel being glued to the second panel; (d) a fourth panel positioned on top of the third panel, the fourth panel comprising a plurality of lumber positioned side by side and transverse to the plurality of lumber of the third panel, the fourth panel being glued to the third panel; (e) a fifth panel positioned on top of the fourth panel, the fifth panel comprising a plurality of lumber positioned side by side and transverse to the plurality of lumber of the fourth panel, the fifth panel being glued to the fourth panel, and (f) an edge protector removably positioned along respective longitudinal sides of the crane mat, the edge protector comprising a U-shaped cross section and a plurality of longitudinal protrusions engaging a plurality of grooves in the first and fifth panels, the plurality of grooves positioned along a portion of respective longitudinal sides of the first and fifth panels.

Another embodiment of a crane mat having a longitudinal length is disclosed, including: (a) a first panel comprising a plurality of lumber positioned side by side, the plurality of lumber oriented transverse to the longitudinal length of the crane mat, (b) a second panel positioned on top of the first panel, the second panel comprising a plurality of lumber positioned side by side and transverse to the plurality of lumber of the first panel, the second panel being glued to the first panel, (c) a third panel positioned on top of the second panel, the third panel comprising a plurality of lumber positioned side by side and transverse to the plurality of lumber of the second panel, the third panel being glued to the second panel, (d) a fourth panel positioned on top of the third panel, the fourth panel comprising a plurality of lumber positioned side by side and transverse to the plurality of lumber of the third panel, the fourth panel being glued to the third panel, and (e) a fifth panel positioned on top of the fourth panel, the fifth panel comprising a plurality of lumber positioned side by side and transverse to the plurality of lumber of the fourth panel, the fifth panel being glued to the fourth panel. In this embodiment, the first, second, third, fourth, and fifth panels comprise softwood, hardwood, or any combination of softwood and hardwood species.

Other embodiments of a crane mat, and variations thereto, are disclosed herein. All of the embodiments of a crane mat disclosed herein may be positioned on the ground for use in the creation of a temporary roadway or platform for vehicles, cranes, construction equipment, and other mobile or stationary machinery. To accommodate relatively wide widths of cranes or other vehicles, crane mats of the instant disclosure are configured for placement on the ground with the long side of each crane mat positioned transverse to the direction of travel of the crane or vehicle thereon. Additional crane mats of the instant disclosure may be positioned in the same orientation with respect to one another, with respective long sides of adjacent crane mats lying adjacent to one another. Crane mats of the instant disclosure may be combined with other mats of different configurations to account for variations in the stability of the ground. For example, crane mats of the instant disclosure may be positioned across timber mats to account for relatively unstable terrain.

An offset pattern can also be created in the field where crane mats of the instant disclosure are all oriented in the same direction but are positioned in a laterally overlapping manner with longitudinal ends of adjacent crane mats positioned offset to one another. The relatively shorter side of the crane mats of the instant disclosure being oriented in the direction of travel of the crane or vehicle best approximates the contour of the ground. As a result, tilting or other undesired movement of each crane mat will be minimized as a crane, for example, travels over a temporary roadway formed from a plurality of crane mats of the instant disclosure. Positioning successive crane mats on the ground with the long sides of each mat positioned adjacent one another and the short sides of each mat oriented in the direction of travel makes it easy for a forklift or crane to quickly install each crane mat sequentially in front of one another by using the prior laid crane mat as the roadway or support for the traversing forklift or crane to enable the forklift or crane to position the next one in line. Crane mats positioned in this orientation on the ground allows for the safe and comfortable passage of cranes and other vehicles on undeveloped ground.

By contrast, orienting multiple crane mats of the instant disclosure side by side to obtain the necessary width to accommodate wide vehicles while orienting the long side of the crane mats in the direction of travel would lead to undesirable tilting, deflection and/or movement of the crane mats as the crane or vehicle travels over the temporary roadway, particularly on ground that slopes upwardly or downwardly in the direction of travel. This orientation will not allow for the safe and comfortable passage of cranes and other vehicles across undeveloped ground.

A method of making a crane mat comprising a length that is longer than a width is disclosed, comprising: (a) vacuum lifting and positioning on an automatically vertically indexing table a first panel to receive a plurality of panels thereon, the first panel comprising a plurality of first lumber members positioned side-by-side, each of the plurality of first lumber members being oriented in a first direction that is parallel to the width, (b) dispensing an adhesive on a top surface of the first panel, (c) vertically positioning the indexing table to receive a second panel, (d) vacuum lifting and positioning the second panel on the top surface of the first panel, the second panel comprising a plurality of second lumber members positioned side-by-side, each of the plurality of second lumber members being oriented in a second direction that is parallel to the length, (f) dispensing an adhesive on a top surface of the second panel, (g) vertically positioning the indexing table to receive a third panel, (h) vacuum lifting and positioning the third panel on the top surface of the second panel, the third panel comprising a plurality of third lumber members positioned side-by-side, each of the plurality of third lumber members being oriented in the first direction, (i) dispensing an adhesive on a top surface of the third panel, (j) vertically positioning the indexing table to receive a fourth panel, (k) vacuum lifting and positioning the fourth panel on the top surface of the third panel, the fourth panel comprising a plurality of fourth lumber members positioned side-by-side, each of the plurality of fourth lumber members being oriented in the second direction, (l) dispensing an adhesive on a top surface of the fourth panel, (m) vertically positioning the indexing table to receive a fifth panel, (n) vacuum lifting and positioning the fifth panel on the top surface of the fourth panel, the fifth panel comprising a plurality of fifth lumber members positioned side-by-side, each of the plurality of fifth lumber members being oriented in the first direction, (o) applying a compressive force to the first, second, third, fourth and fifth panels as a unit until the adhesive is set, and (p) cutting the unit to desired peripheral dimensions.

The method may include the step of vacuum lifting and positioning a divider panel on the indexing table before step (a). The divider panel may be made from a plastic, such as high density polyethylene (HDPE), which impedes the adhesive from sticking to the divider panel. The method may include the step of vacuum lifting and positioning a divider panel on the indexing table after step (n). The method may include repeating steps (a) through (o) at least four times to form a stack of at least five units, wherein each of the units is separated by a divider panel, and applying the compressive force to the stack of at least five units until the adhesive is set. The method may include the step of de-stacking the units before cutting. De-stacking may be performed using a vacuum lift system.

The step of applying a compressive force to the unit may include applying pressure for approximately 25 minutes. The first and the fifth panels may include hardwood lumber and the second, the third, and the fourth panels may include softwood lumber.

The method may include the step of planing a top and a bottom face of each of the first, the second, the third, the fourth, and the fifth lumber members before initiating step (a). The method may include the step of forming the first panel, the second panel, the third panel, the fourth panel, and the fifth panel by positioning the respective plurality of first, second, third, fourth, and fifth lumber members side-by-side.

A high speed manufacturing system for making a crane mat is disclosed, comprising a layer assembler that positions lumber members horizontally side-by-side to form a lumber layer of a desired peripheral size, a robotic assembler comprising (a) a vacuum lifter to lift and position the lumber layer onto an indexer table, wherein the indexer table automatically adjusts a height of the table to receive the lumber layer and a plurality of next lumber layers positioned in sequence vertically thereon and transverse to one another, and (b) an adhesive dispenser to dispense adhesive across each lumber layer, a press to compress at least five lumber layers together as an assembled unit to bond the layers by the adhesive, and a plurality of saws to cut the bonded layers to a finished size while the assembled unit is conveyed past the saws.

The lumber members in respective top and bottom panels may include a hardwood species, and the lumber members in each of the panels positioned between the top and bottom panels may include a softwood species. The press may be one of a plurality of laterally movable presses configured to receive the unit from the robotic assembler.

The system may include a conveyor to continuously convey lumber. The system may include a planer connected to the conveyor to plane the lumber prior to forming the lumber layer. The system may include a primer connected to the conveyor to prime the lumber after planing but prior to forming the lumber layer. The system may include a computer controller comprising a computer processor, a computer readable medium accessible by the processor, and software stored on the computer readable medium for executing the step of controlling the conveyor, the planer, the primer, the robotic assembler, the adhesive dispenser, the press, and the saws.

The press may be configured to apply a compressive force simultaneously to at least 5 assembled units mounted on top of one another. The system may include a layer trimmer configured to trim each of a plurality of longitudinal ends of the lumber members positioned side-by-side to adjust a length of the lumber members to form the lumber layer.

A method of making a crane mat is disclosed, comprising: (1) positioning a plurality of lumber members side by side to form a plurality of panels, (2) positioning a plurality of panels on one another in alternating transverse directions with respect to one another, where the plurality of lumber members in a top panel and a bottom panel are oriented in a transverse direction, and where the plurality of lumber members in at least one panel positioned between the top panel and the bottom panel is oriented in a longitudinal direction, and (3) bonding each of the panels to an adjacent one of the panels with an adhesive.

The plurality of lumber members in the top and bottom panels may include a hardwood species, and the plurality of lumber members in the panels positioned between the top and bottom panels may include a softwood species.

BRIEF DESCRIPTION OF THE DRAWINGS

FIG. 1C illustrates another embodiment of a crane mat of the instant disclosure.

FIG. 1D illustrates a side end view of the embodiment shown in FIG. 1C.

FIG. 2A illustrates another embodiment of a crane mat of the instant disclosure.

FIG. 2B illustrates a side end view of the embodiment shown in FIG. 2A.

FIG. 3B illustrates an unexploded view of the embodiment shown in FIG. 3A.

DETAILED DESCRIPTION

Figure 1A:
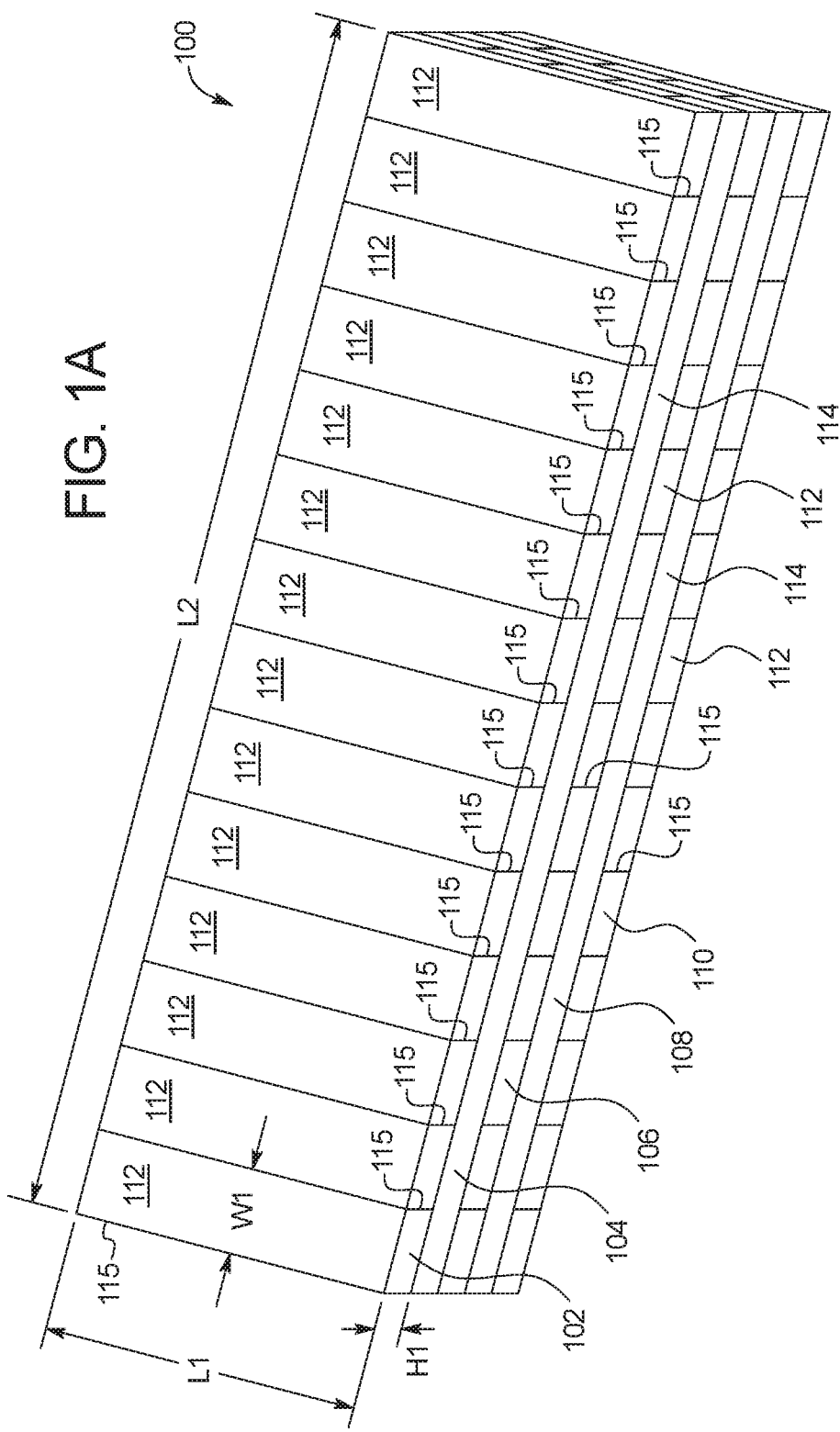
FIG. 1A illustrates one embodiment of a crane mat of the instant disclosure.

Although the figures and the instant disclosure describe one or more embodiments of a crane mat, one of ordinary skill in the art would appreciate that the teachings of the instant disclosure would not be limited to these embodiments. For example, the instant disclosure can also apply to access mats and other temporary roadway or ground protection devices.

Turning now to the drawings wherein like reference numerals refer to like elements, FIGS. 1A-1F, 2A-2B, 3A-3C, and 4A-4B illustrate exemplary embodiments and methods of manufacture of a crane mat comprising a plurality of panels for use in the creation of a temporary roadway or platform for vehicles, cranes, construction equipment, and other mobile or stationary machinery.

Figure 1B:
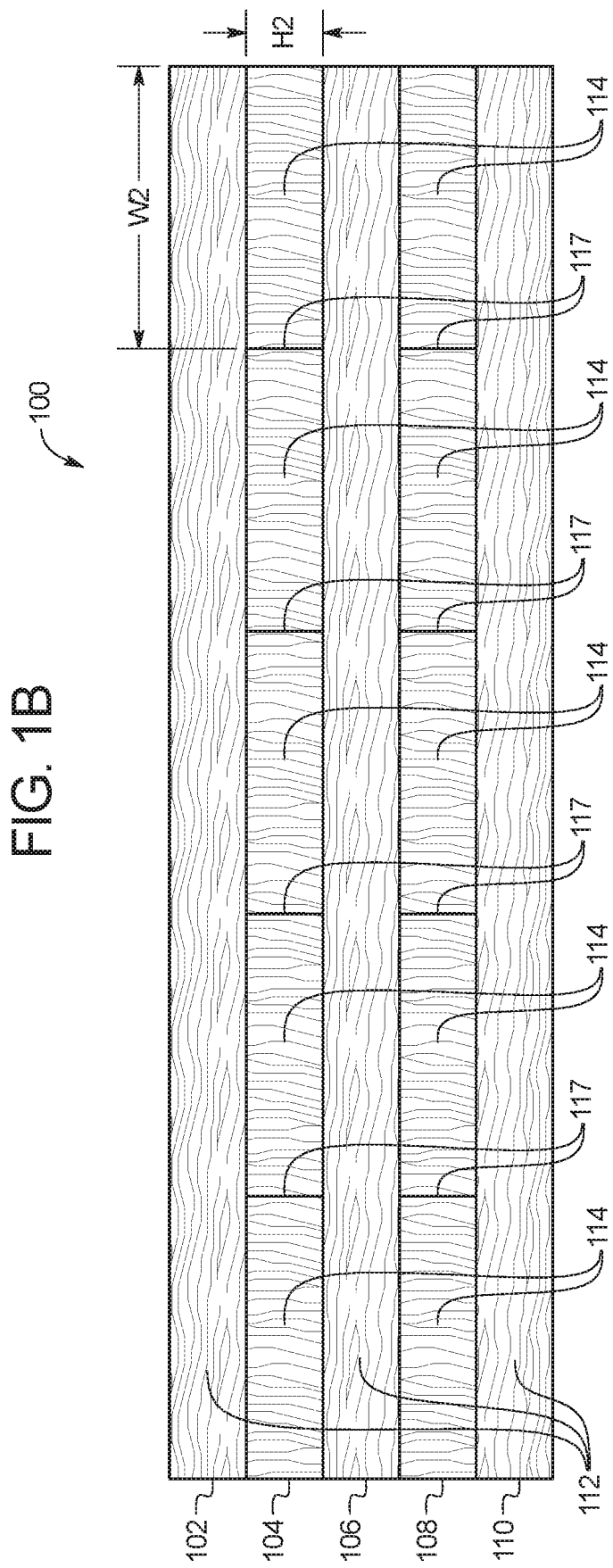
FIG. 1B illustrates a side end view of the embodiment shown in FIG. 1A.

As shown in the embodiment of FIGS. 1A-1B, crane mat 100 includes panels 102, 104, 106, 108, 110. In other embodiments, crane mat 100 may be configured with any number of panels from a minimum of one panel to a maximum of thirteen panels to provide a desired strength and/or operating performance. In this embodiment, panel 102 is positioned on top of panel 104, which is positioned on top of panel 106, which is positioned on top of panel 108, which is positioned on top of panel 110. In other embodiments, panel 110 may be positioned on top of panel 108, which may be positioned on top of panel 106, which may be positioned on top of panel 104, which may be positioned on top of panel 102. In use, crane mat 100 may be fully reversible, with either of panels 102 or 110 acting as the working surface for receiving vehicles, cranes, construction equipment or other mobile or stationary machinery, and with the other of panels 102 or 110 being configured for placement on, for example, the ground, a roadway, a ramp, a platform or other crane mat or object.

In this embodiment, panel 102 is glued to panel 104, panel 104 is glued to panel 106, panel 106 is glued to panel 108, and panel 108 is glued to panel 110. In other embodiments, panels 102, 104, 106, 108, and 110 are connected to one another using bolts, screws, straps, clips, or other fastening or joining techniques or any combination of them. In this embodiment, each of panels 102,106,110 is oriented in a first direction and panels 104,108 are oriented in a second direction approximately 90 degrees relative to panels 102, 106,110. In other embodiments, panels 102,104,106,108, and 110 may be oriented at any angle relative to one another, including all panels lying in the same direction, to provide a desired strength and/or operating performance of crane mat 100. In one embodiment, at least two adjacent panels of the crane mat are aligned in approximately the same direction (see, e.g., FIGS. 1C-1F). The overall strength and rigidity of crane mat 100 is likely maximized, however, by alternating the direction of respective adjacent panel layers.

In this embodiment, each of panels 102,106,110 includes a plurality of members 112 positioned side-by-side along respective side ends 115. Each member 112, and particularly each side end 115 of each member 112, is oriented in the first direction. For purposes of this disclosure, the first direction is oriented parallel to the general direction of travel of vehicular traffic on crane mat 100. As shown in FIGS. 1A-1B, the length "L1" of each member 112 is longer than a width "W1" of each member 112, and the width of each member 112 is longer than a depth or height "H1" of each member 112. Although members 112 are shown in the figures as being of the same length "L1," in other embodiments, for each member 112, the length "L1" thereof may comprise a plurality of separate members that together result in achieving the length "L1" for each member 112. In addition, it should be understood that the combination of members that form each member 112 may vary in length from one to another. Such combination of members forming each member 112 in such other embodiments may be spliced or joined together using any number of techniques, including fingerjointing, lap jointing, rabbit jointing, tongue and groove jointing, miter joining and the like, or they may simply be positioned adjacent one another to form a butt joint. In this way, pieces of lumber having differing lengths can be pieced together to form each member 112.

In this embodiment, each of panels 104,108 includes a plurality of members 114 positioned side-by-side along respective side ends 117. Each member 114, and particularly each side end 117 of each member 114, is oriented in the second direction. As shown in FIGS. 1A-1B, the length "L2" of each member 114 is longer than a width "W2" of each member 114, and the width of each member 114 is longer than a depth or height "H2" of each member 114. Consequently, in this embodiment, the length of each member 114 of each of panels 104,108 is oriented in the second direction, which is 90 degrees relative to the first direction and transverse to the general direction of travel of vehicular traffic on crane mat 100. In addition, as shown in FIGS. 1A-1B, in this embodiment, the length of members 114 is greater than the length of members 112, whereas the width and height of members 114 and members 112 are approximately the same as one another. Although members 114 are shown in the figures as being of the same length "L2," in other embodiments, for each member 114, the length "L2" thereof may comprise a plurality of separate members that together result in achieving the length "L2" for each member 114. In addition, it should be understood that the combination of members that form each member 114 may vary in length from one to another. Such combination of members forming each member 114 in such other embodiments may be spliced or joined together using any number of techniques, including fingerjointing, lap jointing, rabbit jointing, tongue and groove jointing, miter joining and the like, or they may simply be positioned adjacent one another to form a butt joint. In this way, pieces of lumber having differing lengths can be pieced together to form each member 114.

In this embodiment, members 114 are generally aligned in a longitudinal direction (i.e., the second direction) of crane mat 100, and members 112 are generally aligned transverse (i.e., in the first direction) to members 114. Thus, in this embodiment, the length of members 114 defines the longitudinal length of crane mat 100, and the length of members 112 defines the transverse width of crane mat 100, where length "L2" is longer than length "L1". For vehicular traffic moving across crane mat 100 in the first direction and transverse to the longitudinal direction of crane mat 100, members 112 of panel 102 (or panel 110 if oriented upside down as compared to the orientation shown in FIGS. 1A-1B) will be oriented to maximize resistance to wear and damage that may be caused by vehicular traffic over crane mat 100, resulting in longer crane mat life and reduced costs. In other words, vehicular traffic coming upon crane mat 100 will strike a longitudinal end of various members 112 in panel 102 (or panel 110 if oriented upside down) where the end grain of the lumber is exposed. The end grain of members 112 provides superior resistance to wear and tear from vehicle traffic, and particularly in comparison to vehicle movement in the second, longitudinal direction of crane mat 100. In addition, because the majority of the panels in crane mat 100 comprise members 112 having length "L1" that is shorter than members 114 having length "L2", crane mat 100 may contour to the actual surface of the ground, and will result in a lower weight crane mat that reduces shipping costs.

In one embodiment, crane mat 100 is configured to be approximately 4 feet wide in the first, transverse direction and 16 feet long in the second, longitudinal direction. In another embodiment, crane mat 100 is configured to be approximately 4 feet wide in the first, transverse direction and 18 feet long in the second, longitudinal direction. In another embodiment, crane mat 100 is configured to be approximately 4 feet wide in the first, transverse direction and 20 feet long in the second, longitudinal direction. In another embodiment, crane mat 100 is configured to be approximately 4 feet wide in the first, transverse direction and 22 feet long in the second, longitudinal direction. In yet another embodiment, crane mat 100 is configured to be approximately 4 feet wide in the first, transverse direction and 24 feet long in the second, longitudinal direction. In other embodiments, crane mat 100 may have a width that is smaller or larger than 4 feet and a length that is shorter or longer than 16 feet. In use, multiple crane mats 100 may be abutted adjacent one another or attached to one another along the long side of crane mat 100 to orient the short side of crane mat 100 and particularly members 112 so as to be positioned in the direction of vehicle movement. In this way, the long side of the crane mat is positioned to accommodate wide vehicles traveling parallel to the orientation of members 112.

In other embodiments, crane mat 100 is configured to be approximately 8 feet wide in the first, transverse direction and either 14, 16, or 18 feet long in the second, longitudinal direction. In some embodiments, the top layer and the bottom layer of crane mat 100 may be configured with hardwood dimensional lumber that is 8 feet long positioned side-by-side and oriented in the first, transverse direction until the desired 14, 16, or 18 feet long in the second, longitudinal direction is obtained. Each one of a pair of longitudinally-oriented intermediate layers comprising softwood dimensional lumber is positioned immediately adjacent respective top and bottom hardwood layers. In these intermediate layers, softwood dimensional lumber that is either 14, 16, or 18 feet long (depending on the desired width of the crane mat) is oriented in the second, longitudinal direction side-by-side until the desired depth, such as 8 feet, is obtained. For a 5-layer crane mat 100, a third intermediate (middle) layer comprising softwood dimensional lumber is positioned immediately adjacent and between the two longitudinally-oriented intermediate layers. The third intermediate (middle) layer comprises softwood dimensional lumber that is 8 feet long positioned side-by-side and oriented in the first, transverse direction until the desired 14, 16, or 18 feet long in the second, longitudinal direction is obtained. The respective layers of crane mat 100 may be glued to one another and pressed together to form a unitary structure. Excess material may be sawed and/or trimmed from all four perimeter sides to obtain uniform dimensions from one crane mat 100 to the next. The top and/or bottom perimeter edges of crane mat 100 may include a chamfer to minimize damage to crane mat 100 due to loading, handling, and usage in field. A single 8 ft×16 ft or 18 ft 5-layer crane mat 100 may be sawn in half to obtain two 4 ft×16 ft or 18 ft 5-layer crane mats 100.

In some embodiments, members 112 are glued or otherwise adhered to one another along respective side ends 115, and members 114 are glued or otherwise adhered to one another along respective side ends 117. In other embodiments, members 112 are connected to one another, and members 114 are connected to one another, using bolts, screws, straps, clips, or other fastening or joining techniques or any combination of them.

In this embodiment, each of members 112 is approximately the same geometry as one another in terms of width, depth, and length. In other embodiments, the width, depth and/or length of members 112 may vary from one to another but may be machined to form finished panels 102,106,110 for crane mat 100. In this embodiment, each of members 114 is approximately the same geometry as one another in terms of width, depth, and length. In some embodiments, the width, depth and/or length of members 114 may vary from one to another but may be machined to form finished panels 104,108 for crane mat 100.

In some embodiments, members 112,114 may include dimensional lumber, including 1×4, 1×6, 1×8, 1×10, 1×12, 2×4, 2×6, 2×8, 2×10, and 2×12. In some embodiments, for any given panel, members 112,114 may comprise the same width of lumber positioned side-by-side to create the panel. In other embodiments, for any given panel, members 112, 114 may comprise different or variable widths of lumber positioned side-by-side to create the panel. In yet other embodiments, for any given panel, members 112,114 may comprise any combination of the same and different widths of lumber positioned side-by-side to create the panel. Members 112,114 of one or more panels of crane mat 100 may include softwood lumber comprising, for example, spruce, pine, fir, southern yellow pine, or hemlock, hardwood lumber comprising, for example, oak, maple, hickory, hackberry, or cherry, or any combination of softwood or hardwood. For any given member 112,114, a hardwood species, such as oak, may lie adjacent to a different hardwood species, such as hickory, and a softwood species, such as pine, may lie adjacent to a different softwood species, such as fir. In some embodiments, a hardwood panel comprising members 112 or 114 may comprise hardwood lumber 1 inch thick with lumber comprising different widths positioned side-by-side. In other embodiments, a softwood panel comprising members 112 or 114 may comprise softwood lumber 2 inches thick with lumber comprising different widths positioned side-by-side. In some embodiments, a panel made of one or more hardwood species of lumber may be positioned adjacent above or below and glued to a panel made of one or more softwood species of lumber. In other embodiments, members 112,114 may include any material in any stock dimension suitable for creating a temporary roadway, including a plastic, a composite, or a metal.

Turning to FIGS. 1C-1D, there is shown another embodiment of crane mat 100. In particular, panel 106 is replaced by panel 111 having a plurality of members 114 positioned side-by-side along respective side ends 117. Each member 114 of panel 111 is oriented in a longitudinal direction (i.e., the second direction) of crane mat 100. However, as shown in FIG. 1D, each of members 114 of panel 111 are positioned laterally offset in the first direction relative to respective members 114 in adjacent panels 104,108. The offset side ends 117 of members 114 of respective panels 104,111,108 provide enhanced lateral stiffness of crane mat 100 in the first direction while permitting enhanced longitudinal flexibility in the second direction than the embodiment of crane mat 100 shown in FIGS. 1A-1B.

Figure 1E:
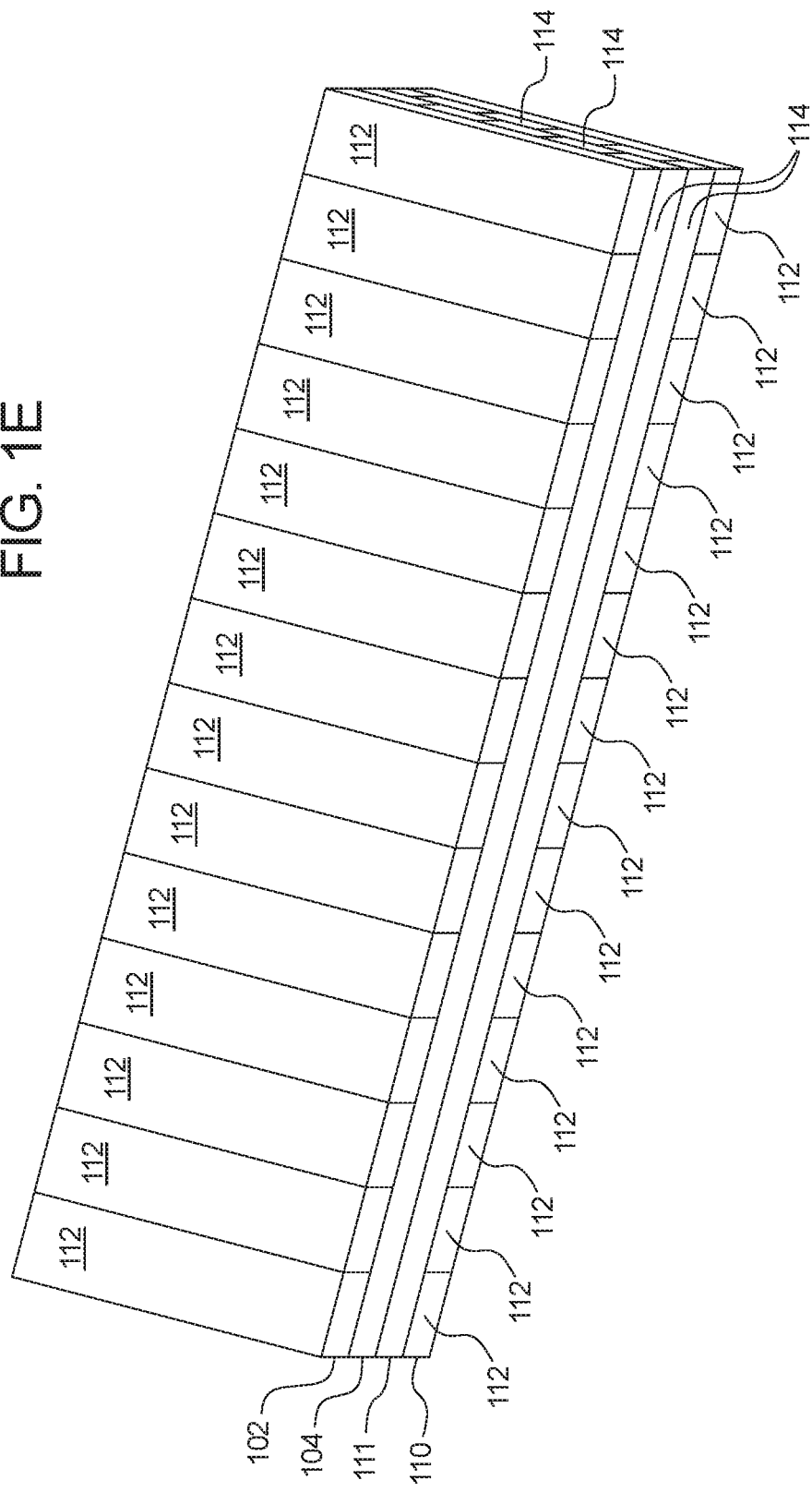
FIG. 1E illustrates another embodiment of a crane mat of the instant disclosure.
Figure 1F:
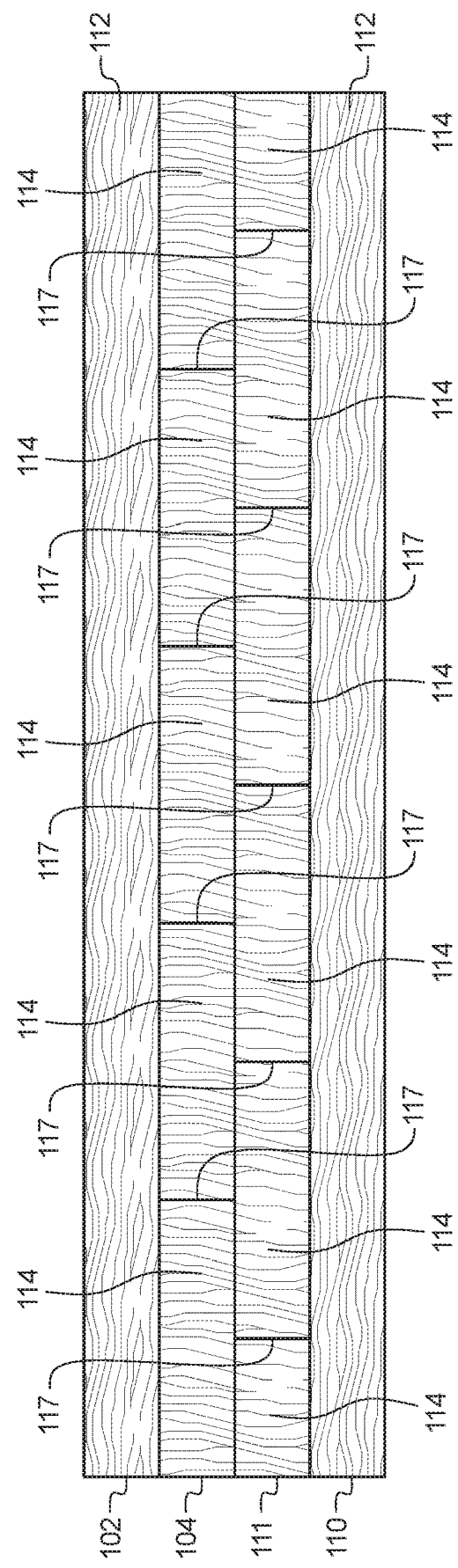
FIG. 1F illustrates a side end view of the embodiment shown in FIG. 1E.

FIGS. 1E-1F show yet another embodiment of crane mat 100. In this embodiment, panels 106,108 are replaced in their entirety by panel 111 having a plurality of members 114 positioned side-by-side along respective side ends 117 to form a four panel embodiment of crane mat 100. Like the embodiment shown in FIGS. 1C-1D, each member 114 of panel 111 is oriented in a longitudinal direction (i.e., the second direction) of crane mat 100. Similarly, each of members 114 of panel 111 are positioned laterally offset in the first direction relative to respective members 114 in adjacent panel 104. The offset side ends 117 of members 114 of respective panels 104, 111 provide enhanced lateral stiffness of crane mat 100 while permitting enhanced longitudinal flexibility than the embodiment of crane mat 100 shown in FIGS. 1C-1D. In addition, in applications where increased longitudinal flexibility is desired over the embodiment shown in FIGS. 1C-1D, the embodiment of FIGS. 1E-1F provides the added benefits of: (1) reduced fabrication costs due to less material and fewer manufacturing processes needed to produce crane mat 100; (2) reduced transportation costs due to lighter weight finished product and smaller finished product volume, which permits shipping more crane mat units in a single freight transportation container, and (3) easier handling by users due to lighter weight of the finished product.

Turning to FIGS. 2A-2B, there is shown another embodiment of a crane mat. Crane mat 200 includes all of the same features, characteristics, and variations described above for crane mat 100 with the addition of a plurality of slots or grooves 201 disposed on the top panel 202 and/or bottom panel 210 of crane mat 200 for enhancing vehicle traction when traversing across crane mat 200 parallel to the orientation of members 212. In this embodiment, panels 202,204, 206,208,210 of crane mat 200 are identical to panels 102, 104,106,108,110 of crane mat 100 except that panel 202 is shown as including grooves 201 disposed thereon. In some embodiments, crane mat 100 may include grooves 201 as described in more detail below.

As best shown in FIG. 2B, grooves 201 may comprise generally vertical opposing sidewalls 205 and a generally horizontal bottom wall 203. In other embodiments, grooves 201 may comprise a U-shape (with or without a rounded bottom wall), a V-shape, a trapezoidal shape, a semi-circular shape, or any other shape or combination thereof that enhances vehicle traction. In this embodiment, crane mat 200 includes 9 slots or grooves 201 positioned on top panel 202 (and bottom panel 210 to provide reversibility of crane mat 200), though a greater or fewer quantity of grooves 201 are possible.

Grooves 201 may comprise any width and any spacing that permits a desired number of grooves 201 to be positioned on panel 202,210. Grooves 201 may comprise any depth up to at least approximately one half of the thickness of panel 202. In one embodiment, grooves 201 comprise a depth from about 0.100" to about 0.75". In one embodiment, grooves 201 comprise a depth of about 0.25"+/−0.150". In another embodiment, grooves 201 comprise a depth of about 0.50". In another embodiment, grooves 201 comprise a depth of about 0.75". Grooves may vary in depth from one end of crane mat 200 to another end of crane mat to enhance drainage of water from crane mat 200. Grooves 201 may also vary in depth from any point along crane mat 200 relative to any other point along crane mat 200. For example, the depth of grooves 201 may be more shallow in the middle of crane mat 200 and progressively deeper toward the periphery to enhance drainage of water from crane mat 200.

In this embodiment, grooves 201 are generally aligned in a longitudinal direction of crane mat 200 and transverse to members 212, which are generally aligned transverse to members 214. In this embodiment, the length of members 214 defines the longitudinal length of crane mat 200, and the length of members 212 define the transverse width of crane mat 200. For vehicular traffic moving across crane mat 200 parallel to the orientation of members 212 (i.e., in the first direction) and transverse to the longitudinal direction of crane mat 200, transversely aligned members 212 of panel 202 (or panel 210 if grooves 201 are also positioned thereon and if panel 210 is oriented upside down as compared to the orientation shown in FIGS. 2A-2B) will be oriented to maximize resistance to wear and damage that may be caused by vehicular traffic over crane mat 200 while grooves 201 provide for rain, moisture, mud or other debris to collect therein and drain therefrom to enhance traction of the vehicle. In other embodiments, grooves 201 may be oriented in any angle on panel 202 and/or 210. In some embodiments, the angle of grooves 201 relative to other grooves 201 form a pattern on panel 202 and/or 210.

Figure 3A:
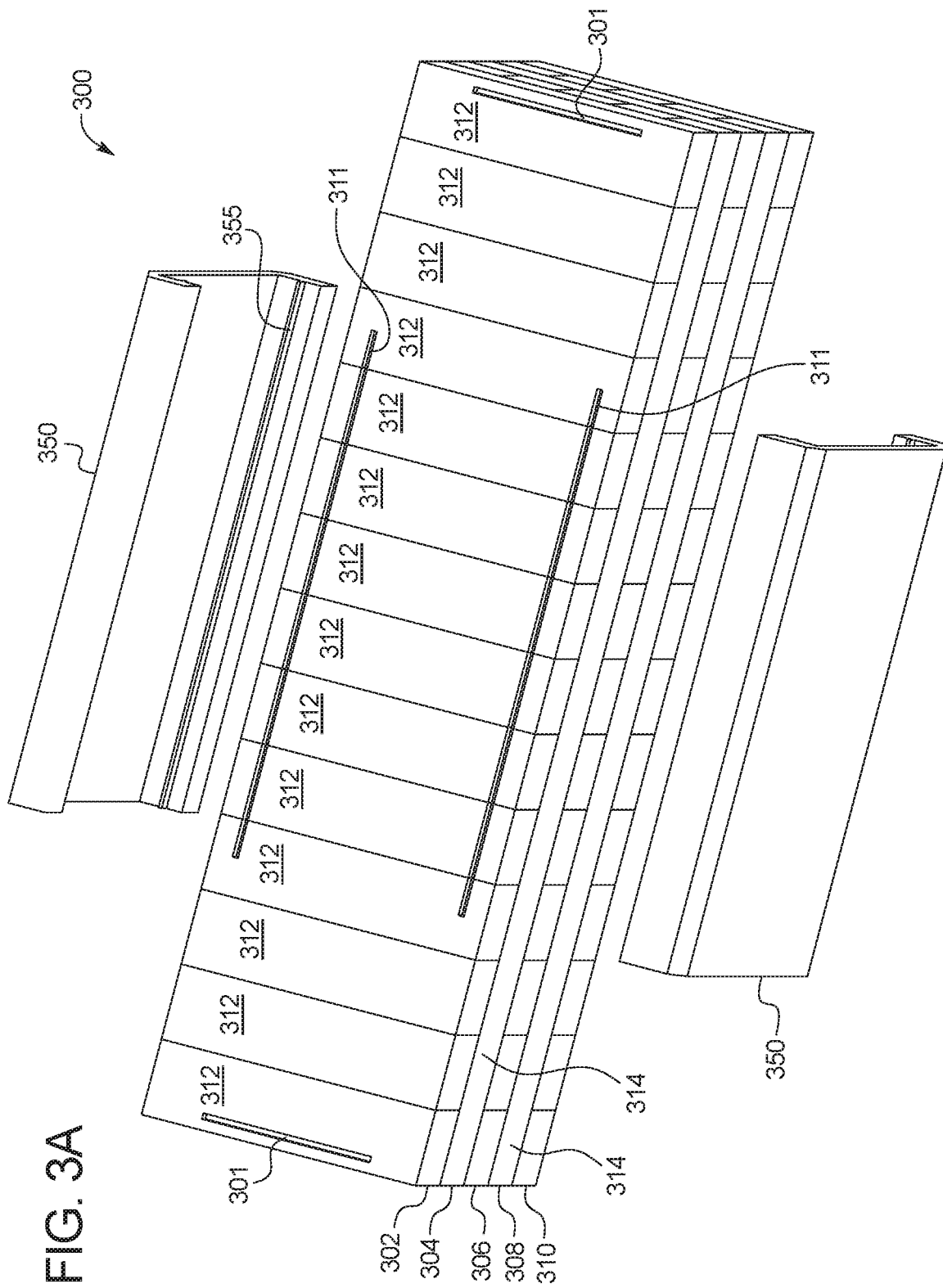
FIG. 3A illustrates a partial exploded view of another embodiment of a crane mat of the instant disclosure.
Figure 3C:
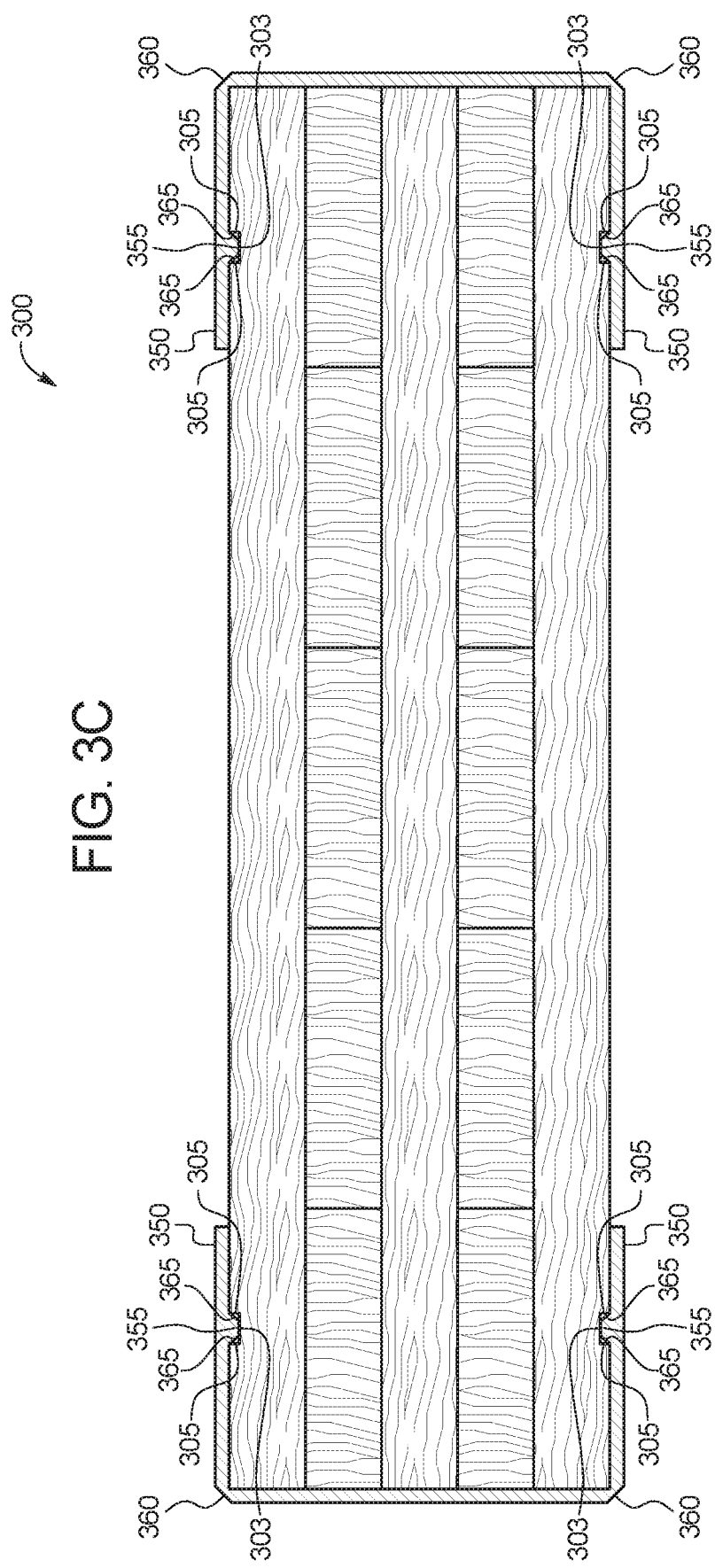
FIG. 3C illustrates a cross sectional view of the embodiment shown in FIG. 3B.

Turning to FIGS. 3A-3C there is shown another embodiment of a crane mat. Crane mat 300 includes all of the same features, characteristics, and variations described above for crane mat 100 with the addition of a plurality of slots or grooves 301,311 disposed on the top panel 302 and/or bottom panel 310 of crane mat 300. In this embodiment, panels 302,304,306,308,310 of crane mat 300 are identical to panels 102,104,106,108,110 of crane mat 100 except that panel 302 is shown as including grooves 301,311 disposed thereon. In some embodiments, crane mat 100 may include grooves 301,311 as described in more detail below.

In this embodiment, grooves 301 are disposed along the first and last members 312 on top panel 302 and/or the first and last members 312 on bottom panel 310 near the periphery of crane mat 300. Grooves 301 provide a means for attaching accessories for joining adjacent mats together and for handling and manipulation of crane mat 300 at, for example, the job site. Grooves 301 may also provide a means for engaging with an embodiment of protectors 350 (discussed below) for protecting at least a portion of a longitudinal end of crane mat 300 during handling and use. In this embodiment, grooves 301 are shown as extending along a portion of members 312. In other embodiments, grooves 301 may extend from one end to the other end of member 312.

In this embodiment, grooves 311 are disposed on top panel 302 and bottom panel 310 longitudinally and transverse to members 312, which are generally aligned transverse to members 314, near the periphery of crane mat 300. Grooves 311 extend along a portion of the periphery of crane mat 300 for limiting the longitudinal motion of protectors 350 (discussed below) when engaged thereto.

Grooves 311 may comprise generally vertical opposing sidewalls 305 and a generally horizontal bottom wall 303. In other embodiments, grooves 311 may comprise a U-shape (with or without a rounded bottom wall), a V-shape, a trapezoidal shape, a semi-circular shape, or any other shape or combination thereof that enables engagement with protrusions 355 of protectors 350. Grooves 311 may comprise any depth up to approximately one half of the thickness of panel 302,310. In one embodiment, grooves 311 comprise a depth from about 0.100" to about 0.75". In one embodiment, grooves 311 comprise a depth of about 0.25"+/−0.150". In another embodiment, grooves 311 comprise a depth of about 0.50". In another embodiment, grooves 311 comprise a depth of about 0.75".

In this embodiment, crane mat 300 also includes protectors 350 that are removably positionable along the longitudinal sides of crane mat 300. Protectors 350 are configured for protecting at least a portion of a longitudinal side of crane mat 300 during handling and use. In this embodiment, crane mat 300 includes two protectors 350. In other embodiments, crane mat 300 may include a greater or fewer number of protectors 350, and crane mat 300 may include a greater or fewer number of grooves 311. Protectors 350 may include a longitudinal chamfer 360 of sufficient size along top and bottom outer edges to permit, for example, a forklift operator to easily insert a forklift blade between two adjacently positioned crane mats 300 having protectors 350 thereon and to separate the two crane mats 300 for subsequent lifting or handling operations.

Protectors 350 may comprise a U-shape to mount over at least a portion of a longitudinal side of crane mat 300. In other embodiments, protectors 350 may be configured to mount over at least a portion of a transverse side of crane mat 300. In such embodiments, protectors 350 may be configured to engage with grooves 301. In this embodiment, protectors 350 are configured for attachment to crane mat 300 via protrusions 355 that are configured to engage with grooves 311. In other embodiments, protectors 350 are configured for attachment to crane mat 300 via an interference fit with crane mat 300.

In this embodiment, protrusions 355 are configured with at least one longitudinal chamfer 365 to permit relatively easy installation and removal of protectors 350 from crane mat 300 when, for example, damage to protector 350 occurs necessitating its replacement. In some embodiments, protrusions 355 have a trapezoidal cross sectional shape.

Protectors 350 may be fabricated from any plastic, including polyethylene, polypropylene, polystyrene, polyamide, polyvinyl chloride, and polycarbonate. Protectors 350 may be fabricated from any metal, including steel and aluminum. Protectors 350 may be fabricated from any composite material, including fiber reinforced plastics and metal composites. Protectors 350 may be fabricated from extrusions, injection moldings, stampings, laminations, forgings, castings, and the like.

Figure 4A:
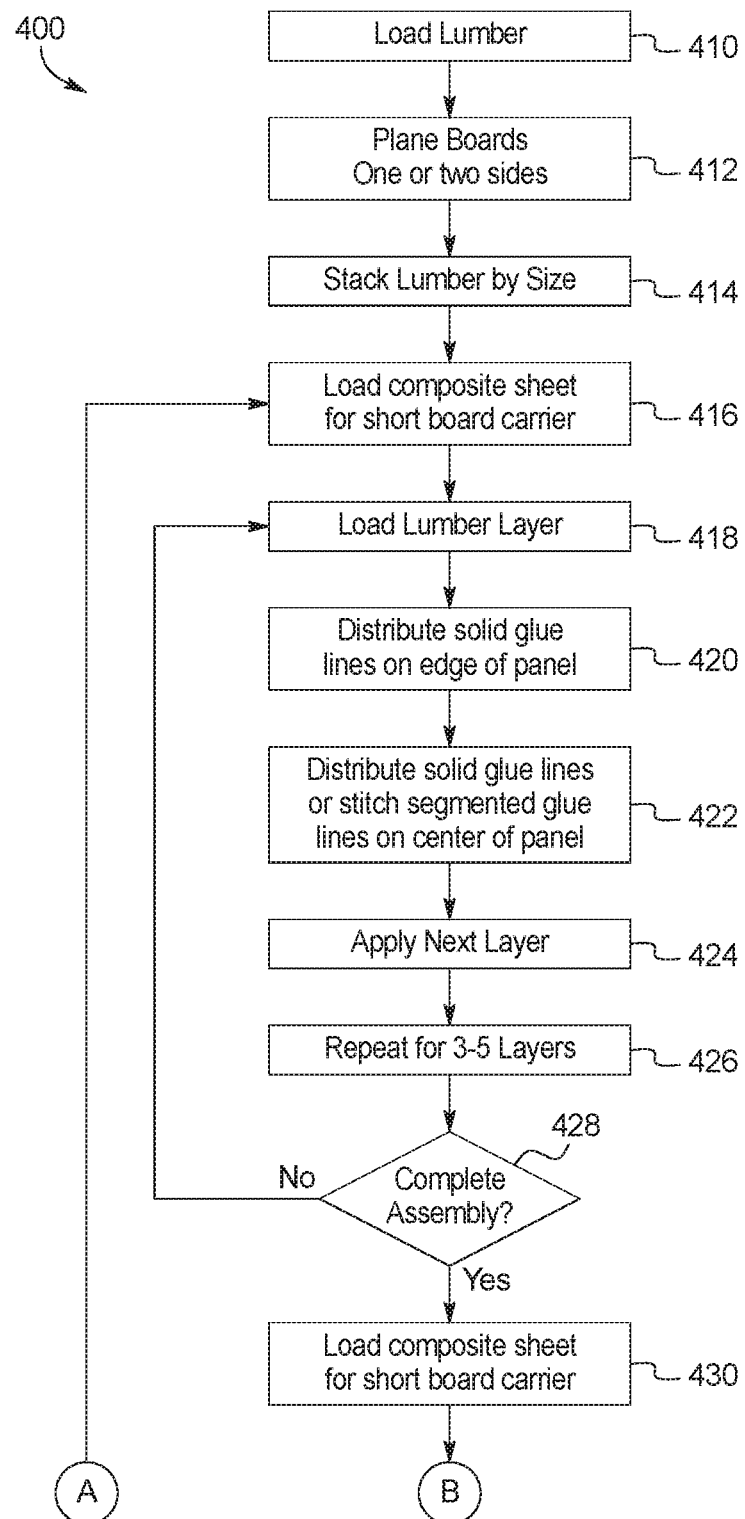
FIGS. 4A and 4B illustrate a block diagram of a method of manufacturing one embodiment of a crane mat of the instant disclosure.
Figure 4B:
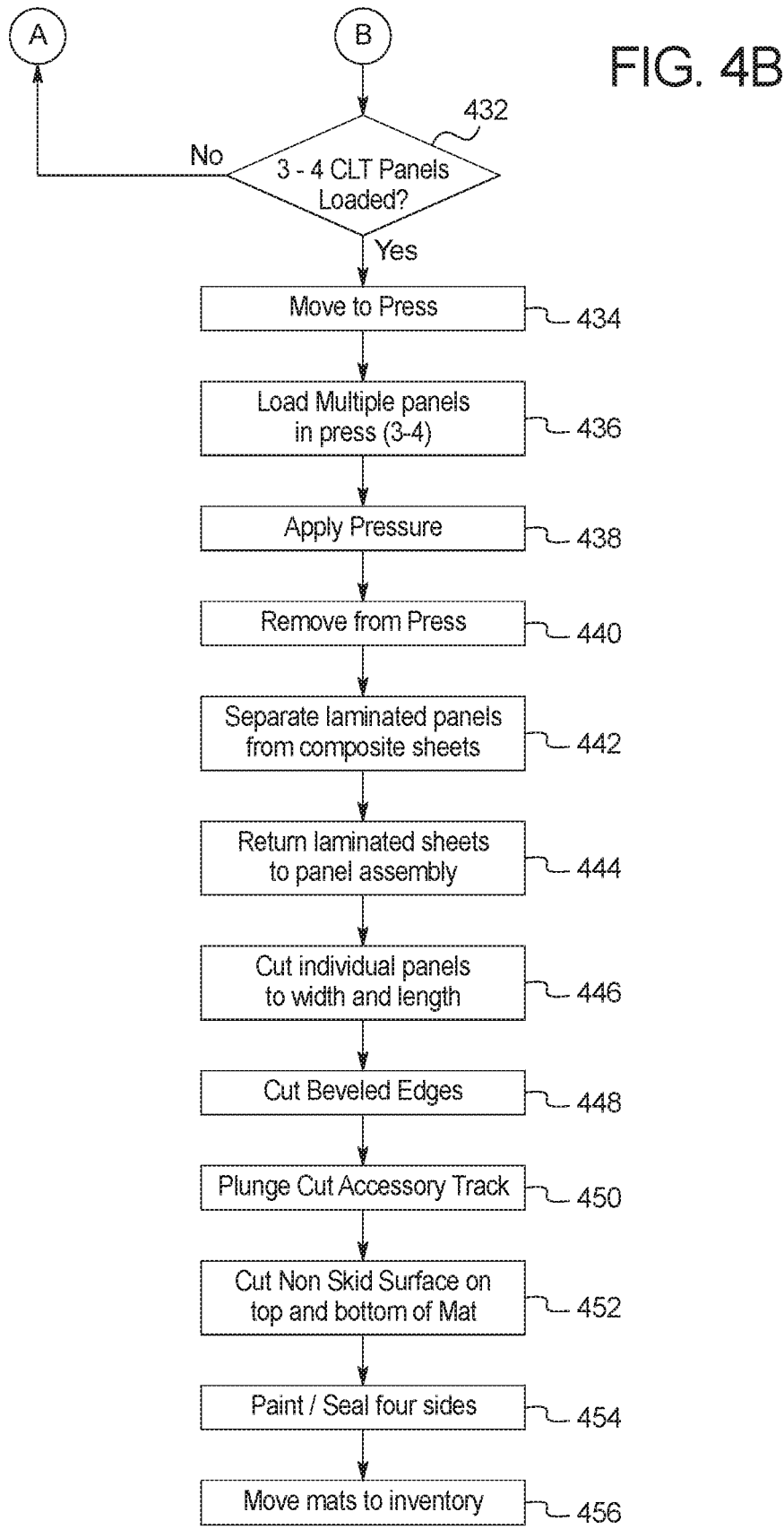

Turning to FIGS. 4A-4B, there is shown one embodiment of a method of making a crane mat of the present disclosure comprising an apparatus or system 400. It should be understood that other types of vehicle or ground protection mats, including access mats, can be manufactured by system 400 using the method disclosed herein. In various embodiments, one or more aspects of system 400 can be merged with one another, omitted, or made part of additional apparatuses or system components. These systems may be configured to fabricate a crane mat billet, which may be further cut or trimmed to meet customer specifications.

In various embodiments, a method of making crane mat 100 includes the steps of (1) receiving lumber of a desired species, cross-sectional dimensions, and length, (2) planing both faces of the lumber to obtain uniform lumber thickness, and to clean and open up the wood fiber on the surface to receive primer and adhesive, (3) priming the planed faces to promote improved adhesion by an adhesive, (4) trimming a group of lumber pieces laid face up and side-by-side to desired peripheral dimensions to form a layer, and in the case of hardwood lumber, drying the lumber surfaces to obtain a desired moisture content of the lumber to coordinate the properties of the lumber with the properties of the chosen adhesive, (5) assembling a group of layers together by (i) perpendicularly orienting respective adjacent layers with respect to one another, (ii) applying adhesive between respective adjacent layers, (iii) applying a compressive force to the assembled layers for a desired period of time to set the adhesive, and (6) cutting the assembled layers to desired dimensions. In some embodiments, multiple 5-layer crane mats 100 are stacked together during the step of applying a compressive force to set the adhesive. In such embodiments, plastic divider panels may be positioned between respective crane mats 100 to act as a separator to ensure that the adhesive does not unintentionally bond adjacent crane mats 100 together.

Turning again to FIGS. 4A-4B, dimensional lumber is loaded into or received by system 400 at Step 410 of system 400. One or more surfaces of the lumber are planed by a planer apparatus at Step 412 of system 400. System 400 is configured to stack lumber at Step 414 according to size for later retrieval. At Step 416, system 400 loads a composite sheet for a carrier apparatus of system 400, after which lumber is loaded side-by-side for a bottom panel of a crane mat at Step 418.

System 400 may be configured to apply glue to a top surface of the bottom panel in a manner that minimizes adhesive material cost, which may otherwise be a significant expense in the construction of a crane mat. In some embodiments, the panel is moved or conveyed under a stationary glue dispensing apparatus while glue is dispensed from the glue dispensing apparatus onto the panel. In other embodiments, the panel is held stationary while the glue dispensing apparatus traverses over the panel and dispenses glue onto the panel. In some embodiments, a continuous (or in some embodiments a discontinuous) ribbon of glue is applied along the perimeter of a given panel while a solid or a stitched pattern of rows of adhesive is applied to the interior, central area of the top surface of the panel. In one embodiment, system 400 includes stationary adhesive nozzles (or other glue dispensing apparatus) positioned in a row transverse to the longitudinal orientation of the panel. As the panel is conveyed longitudinally by a conveyer, system 400 at Step 420 applies a solid glue line along the lateral and longitudinal perimeter of the top surface of the bottom panel while system 400 at Step 422 simultaneously applies a solid and/or a stitched or intermittent glue line along the central area of the top surface of the bottom panel. If a stitched or intermittent glue line is applied, the interval between glue dots or dashes in the central area is dependent on the speed at which the panel is conveyed under the nozzles as well as the pulse duration of the dispensing of glue from the nozzles. In another embodiment, system 400 includes traversing adhesive nozzles (or other glue dispensing apparatus) positioned in a row transverse to the longitudinal orientation of the panel. As the adhesive nozzles traverse over the stationary panel, system 400 at Step 420 applies a solid glue line along the lateral and longitudinal perimeter of the top surface of the bottom panel while system 400 at Step 422 simultaneously applies a solid and/or a stitched or intermittent glue line along the central area of the top surface of the bottom panel. If a stitched or intermittent glue line is applied, the interval between glue dots or dashes in the central area is dependent on the speed at which the adhesive nozzles traverse over the panel as well as the pulse duration of the dispensing of glue from the nozzles.

At Step 424, the same glue application technique is performed by system 400 to the next succeeding panel, which will be oriented transverse to the bottom panel, and which is stacked upon the bottom panel. The load, stacking, and gluing process of Steps 418, 420, 422, and 424 is repeated at Steps 426 and 428 for the additional panels that will be stacked to form the desired crane mat. An assembled plurality of laminated, composite panels of a crane mat are then stacked on top of an additional plurality of composite panels of separate crane mats at Steps 430, 432, 434, and 436 and all are pressed in a press system of system 400 at Step 438. In some embodiments, 3 or 4 sets of crane mats may be pressed at one time in this way. In other embodiments, a greater or fewer number of crane mats may be pressed at the same time.

At Steps 440, 442, and 444 the composite panels are removed from the press system of system 400 and separated from one another. At Step 446, the composite panels of a particular crane mat are cut by one or more cutting machines of system 400 to a desired finished length and width. At Step 448, the various edges of the crane mat may optionally be beveled by system 400. For various embodiments of crane mats, at Step 450 one or more routers or plunge cutters of system 400 are configured to cut optional grooves 301,311 discussed above on either or both of the top or bottom surfaces of the crane mat. For various embodiments of crane mats, at Step 452 one or more routers or plunge cutters of system 400 are configured to cut optional grooves 201 on either or both of the top or bottom surfaces of the crane mat. At Step 454, system 400 is configured to optionally paint or seal one or more sides of the crane mat. At Step 456, the completed crane mat having the desired configuration is moved to inventory.

Figures 1, 5A:
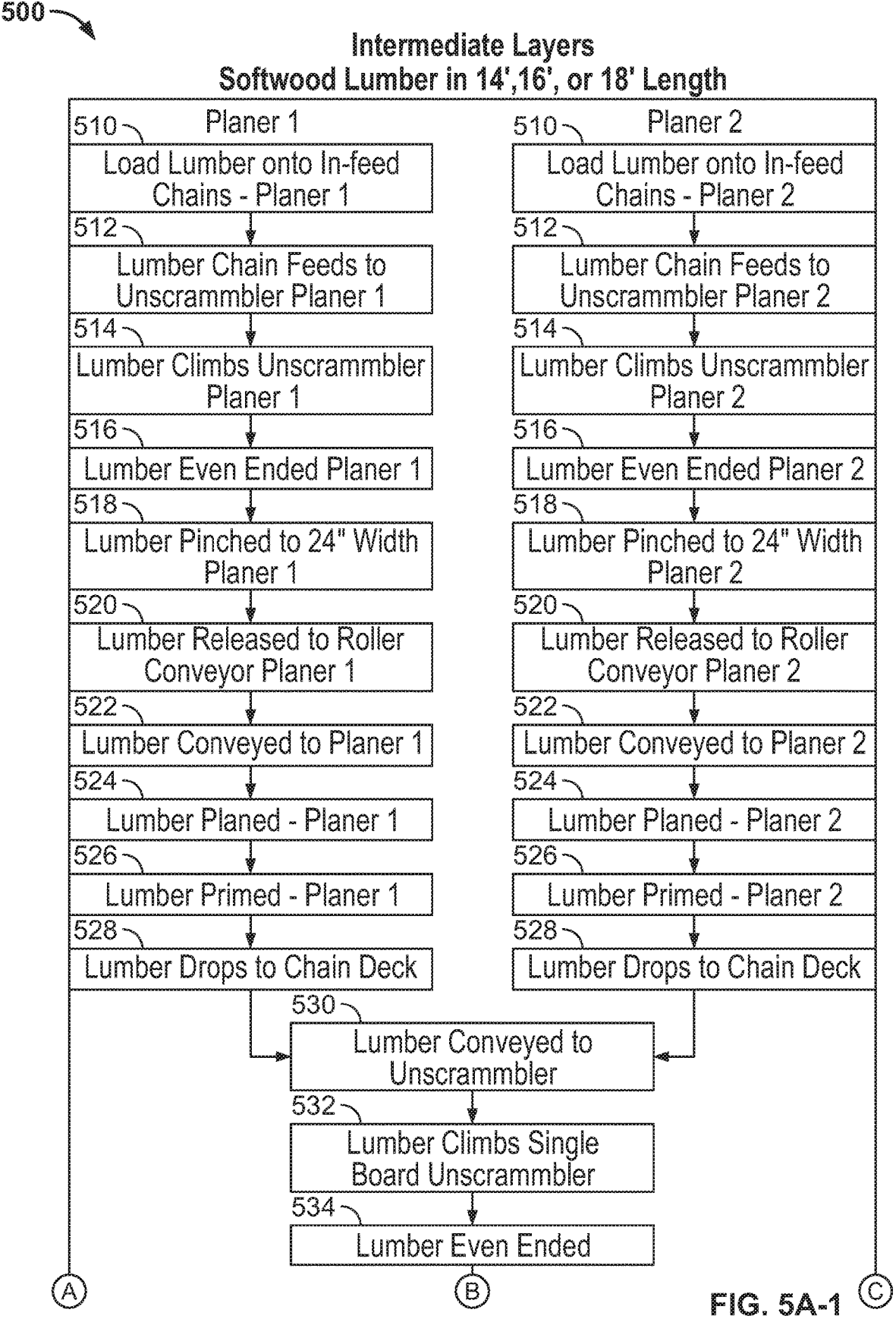
FIGS. 5A-1 through 5A-8 illustrate a block diagram of a method of manufacturing at least one embodiment of a crane mat of the instant disclosure.
Figures 2, 5A:
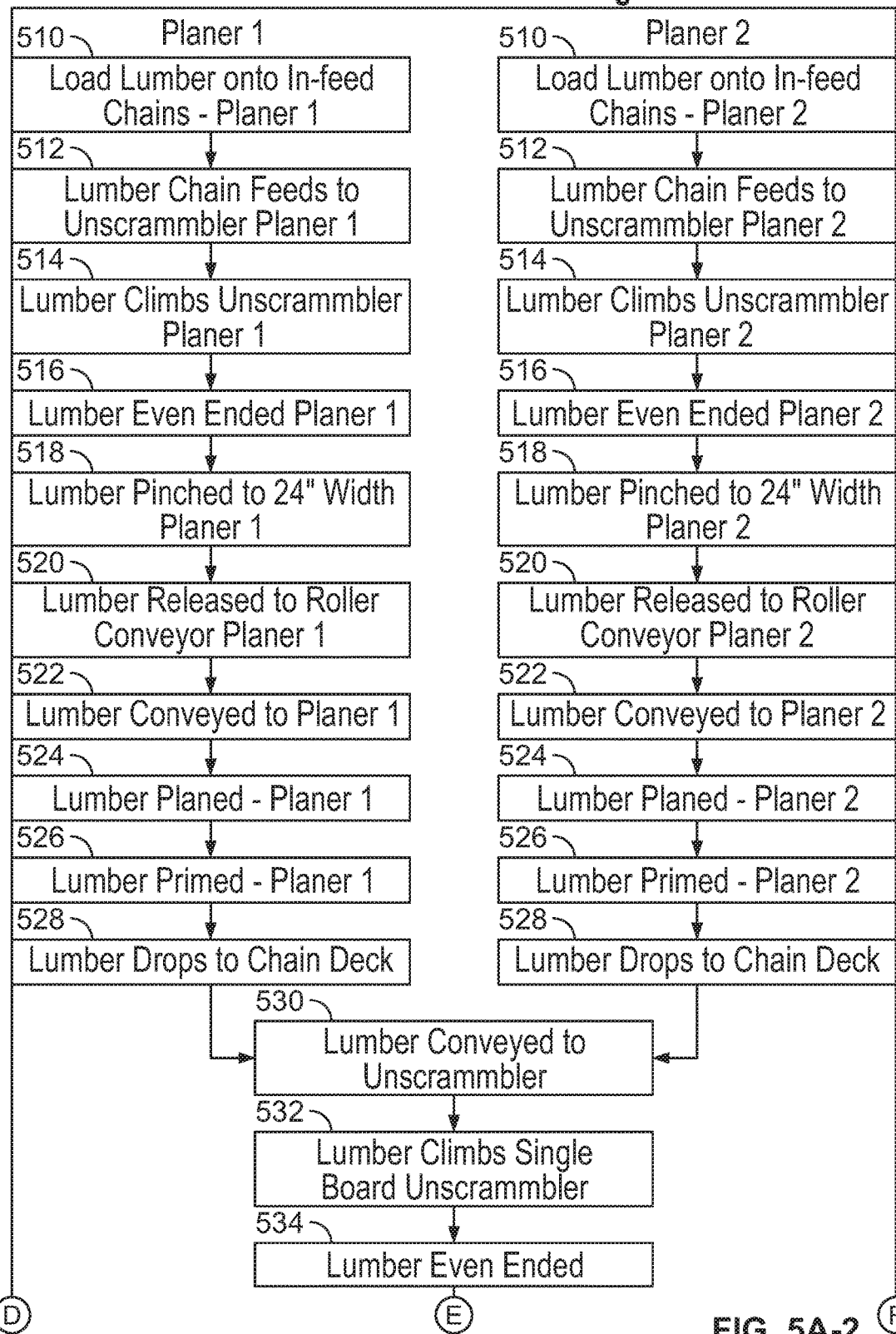
Figures 3, 5A:
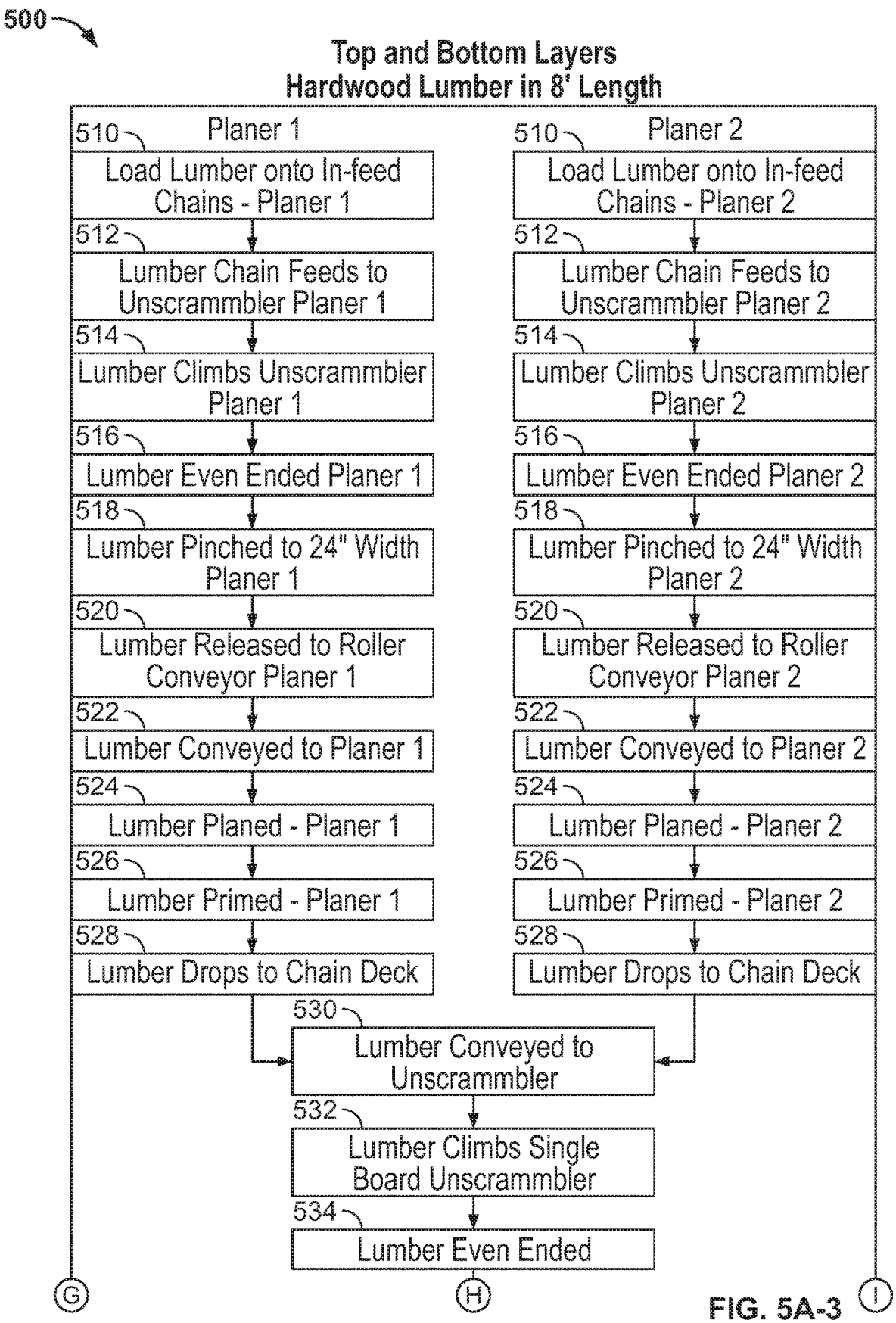
Figures 4, 5A:
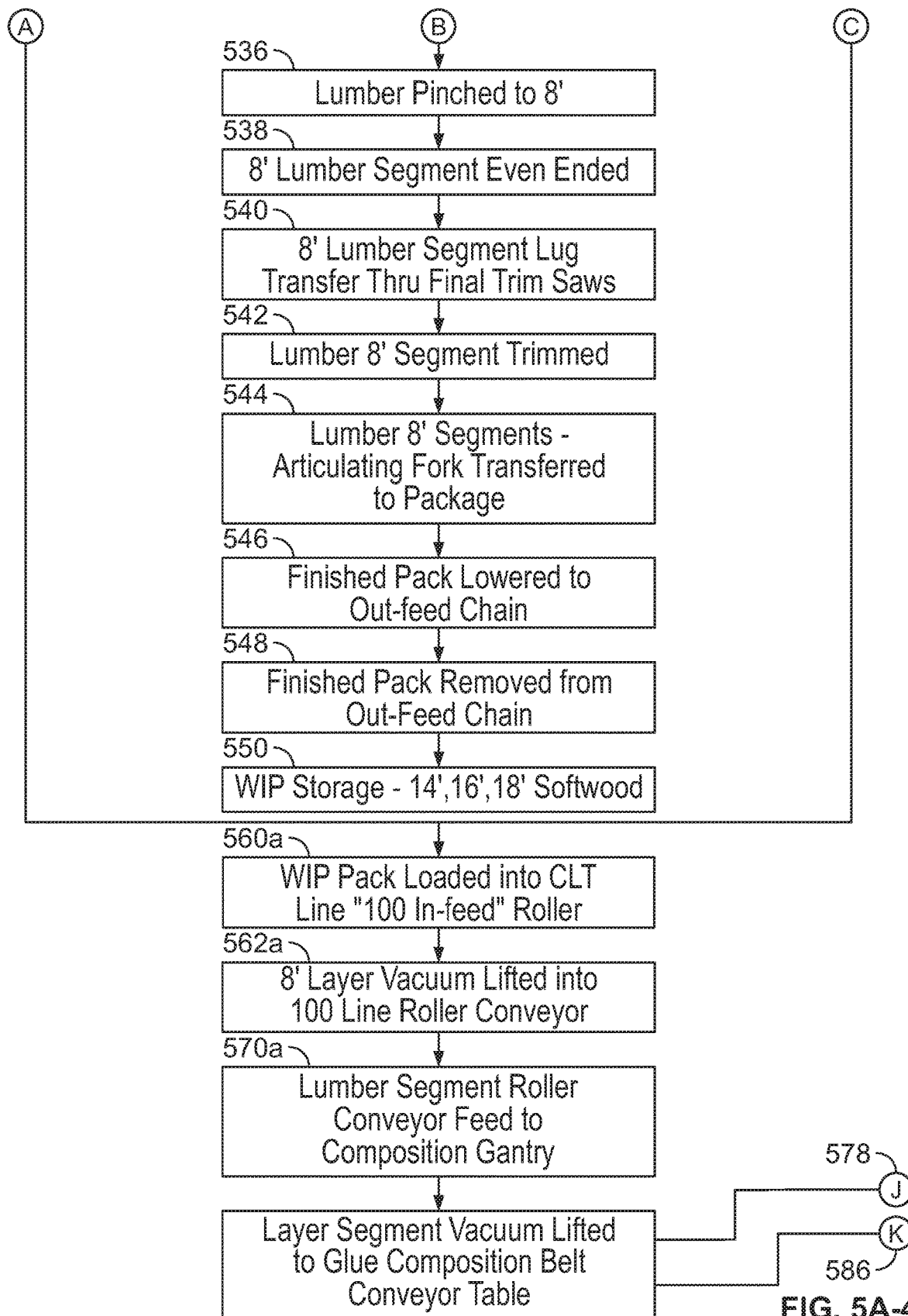
Figures 5, 5A:
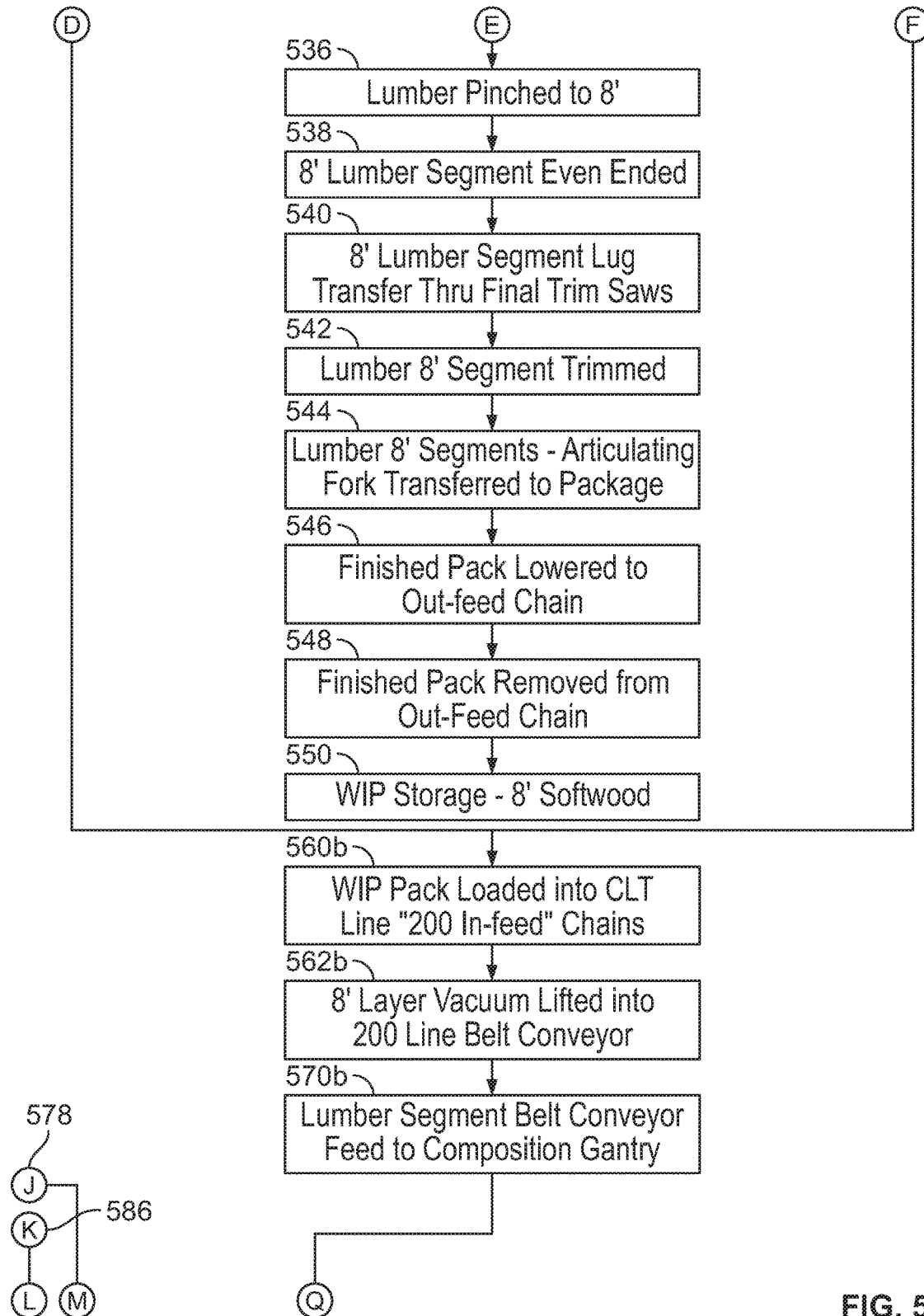
Figures 5, 5A, 6:
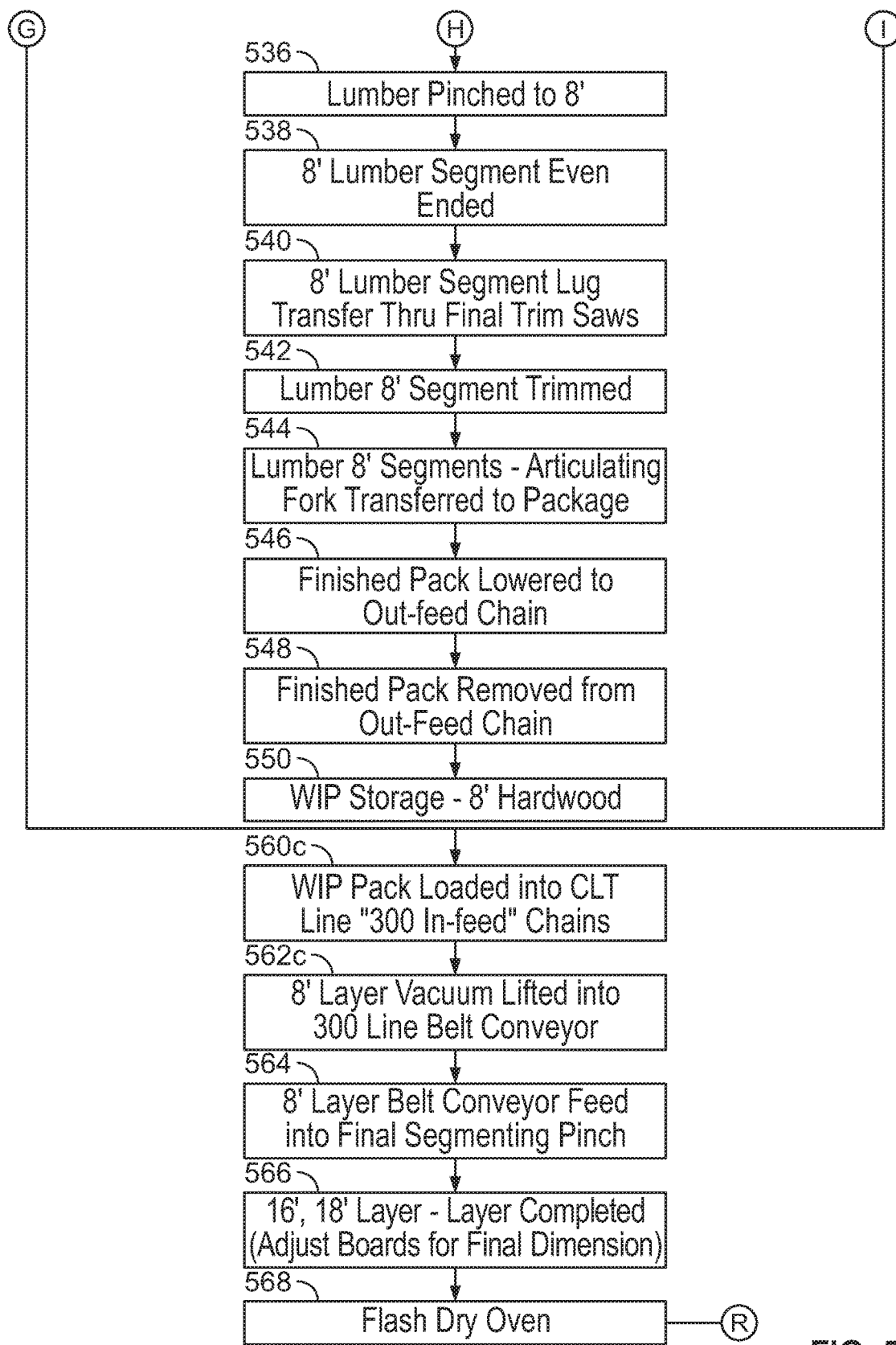
Figures 5, 5A, 6, 7:
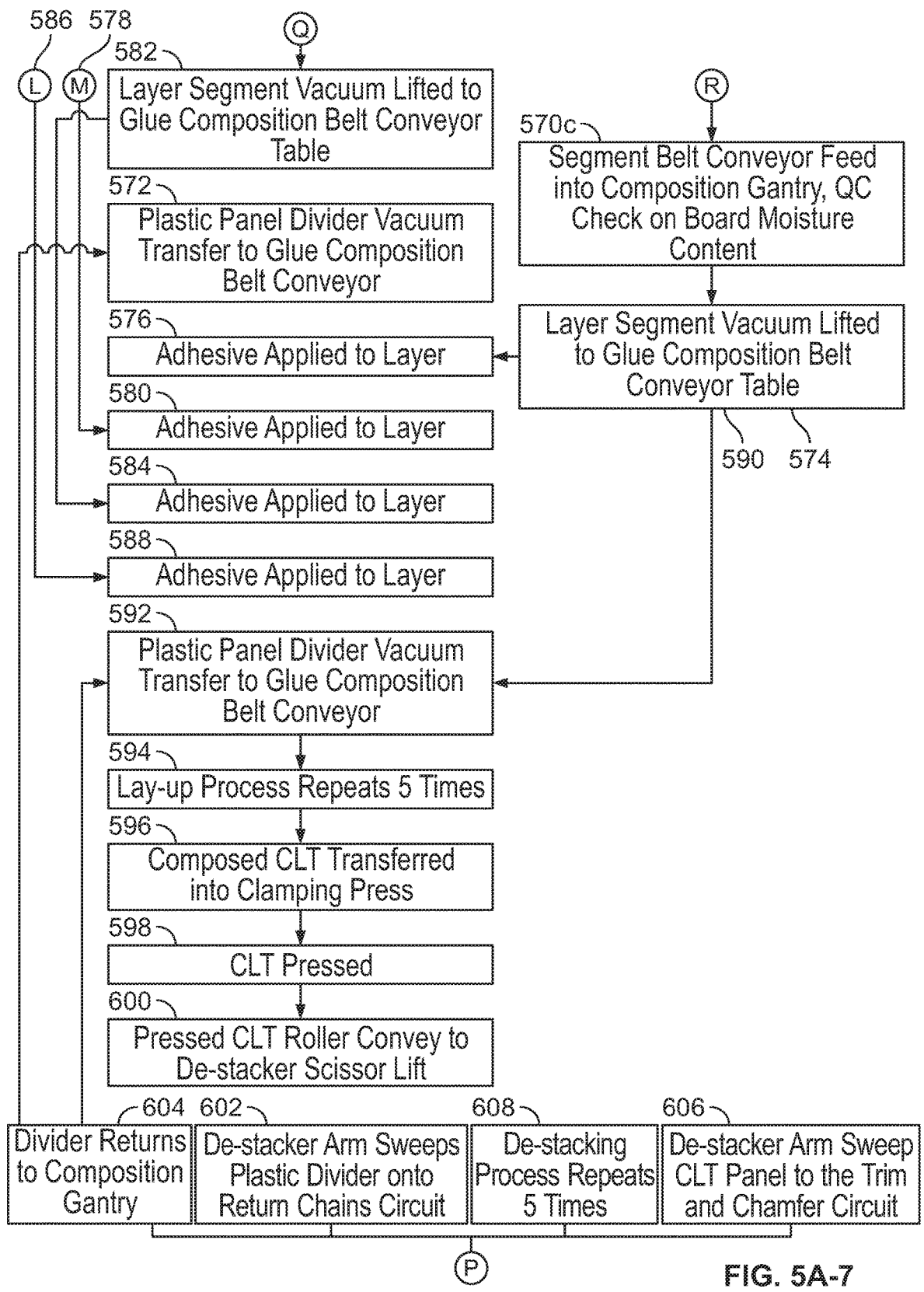
Figures 5, 5A, 6, 7, 8:
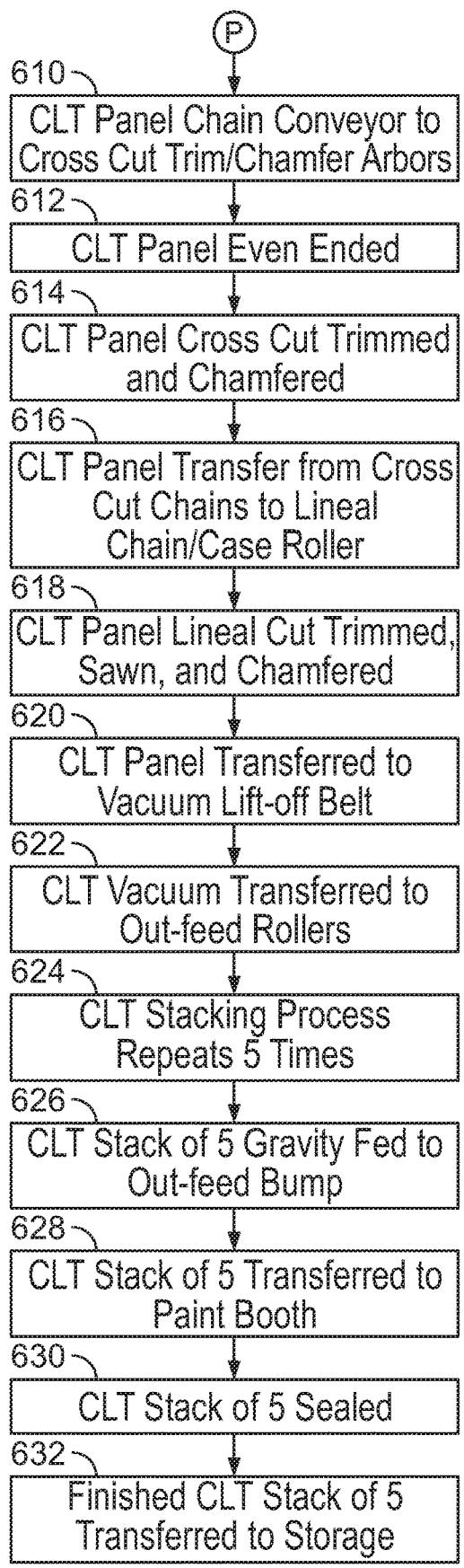

Turning to FIGS. 5A1-5A8, there is shown another embodiment of a method of making a crane mat of the present disclosure comprising an apparatus or system 500. It should be understood that other types of vehicle or ground protection mats, including access mats, can be manufactured by system 500 using the method disclosed herein. In various embodiments, one or more aspects of system 500 can be merged with one another, omitted, or made part of additional apparatuses or system components. These systems may be configured to fabricate a crane mat billet, which may be further cut or trimmed to meet customer specifications. Crane mats comprising any number of layers may be manufactured using the methods disclosed herein. In one embodiment, system 500 is configured to produce a 5-layer crane mat with hardwood top and bottom layers and softwood intermediate layers. In one embodiment, a 5-layer crane mat, such as crane mat 100, includes 8 ft long hardwood lumber members on the top and bottom layers, 8 ft long southern yellow pine (or other softwood) for the middle layer, and either 16 ft or 18 ft long southern yellow pine (or other softwood) for the two intermediate layers positioned on opposite sides of the middle layer and adjacent to respective hardwood layers. As mentioned above and as discussed below, an 8 ft×16 ft or 16 ft 5-layer crane mat 100 may be sawed in half to obtain two 4 ft×16 ft or 18 ft 5-layer crane mats 100. System 500 may be used to manufacture 3-layer mats. In one embodiment, a 3-layer mat manufactured by system 500 includes 14 ft long southern yellow pine (or other softwood) lumber members on the top and bottom layers and 8 ft long southern yellow pine (or other softwood) for the middle layer. In some embodiments, a 3-layer mat is configured to omit some of the lumber members in the bottom layer to help fixate the mat in place on the ground during use and to reduce or eliminate unintended hydroplaning that may otherwise occur in wet fields.

As shown in the figures, to optimize the production of crane mats, system 500 may have multiple, continuous feed, planer lines, as identified by "planer 1" and "planer 2". In this embodiment, dimensional lumber is loaded into or by system 500 at Step 510 of system 500. The dimensional lumber may be softwood for one or more middle layers of the crane mat or hardwood for one or more outer layers of the crane mat. As shown in FIG. 5A-1, to manufacture an intermediate layer for either a 4 ft×16 ft 5-layer crane mat or a 4 ft×18 ft 5-layer crane mat, dimensional softwood lumber, such as southern yellow pine, that is 16 ft long or 18 ft long (depending on the desired width of the mat) is loaded into or received by system 500 at Step 510 of system 500. The softwood may have previously been kiln dried to Southern Pine Inspection Bureau (SPIB) specifications for moisture content to range from approximately 14% to approximately 19%, which lies within the range for use with the adhesive disclosed herein. At Steps 512 and 514, the lumber is fed via a chain feed mechanism toward an unscrambler, which orderly orients lumber for entry into the planer. At Step 516, individual pieces of lumber are positioned side-by-side against a fence on the distal ends of the boards to cause the distal end of each board to be relatively even with one another. At Steps 518, 520 and 522, the lumber is pinched/grabbed in approximately 24 inch wide groups for conveying to one of two planers. In other words, if 2×8 lumber is being used, then approx. 3 boards may be pinched/conveyed to each of the two planers. If 2×10 lumber is being used, then approx. 2 boards may be pinched/conveyed to each of the two planers.

At Steps 524 and 526, the lumber is conveyed through the planers and primers and planed and primed on at least two sides, for example, the top and bottom faces. At Steps 528, 530, and 532, the planed and primed lumber is dropped onto a chain deck and conveyed to an unscrambler. At Step 534, individual pieces of lumber are positioned side-by-side against a fence on the distal ends of the boards to cause the distal end of each board to be relatively even with one another. At Step 536, the lumber members are pinched together side to side to create an 8 ft wide lumber segment or layer, which is even-ended again at Step 538. This lumber segment or layer is transferred and trimmed at Steps 540 and 542 by crosscutting the longitudinal ends of the boards to obtain a desired length for this lumber segment or layer. Both longitudinal ends of the boards may be sawn to obtain the desired length. At Steps 544, 544, 548, and 550, the trimmed lumber segment or layer is conveyed to a stack for work in process (WIP) storage.

As shown in FIGS. 5A-2 and 5A-5, Steps 510 through 550 are repeated for dimensional softwood lumber, such as southern yellow pine, that is 8 ft long for purposes of manufacturing the middle, transverse layer of either a 16 ft wide 5-layer crane mat or an 18 ft 5-layer crane mat. In addition, as shown in FIGS. 5A-3 and 5A-6, Steps 510 through 550 are repeated for dimensional hardwood lumber that is 8 ft long for purposes of manufacturing the top and bottom layers of either a 16 ft wide 5-layer crane mat or an 18 ft 5-layer crane mat. In this way, respective softwood and hardwood lumber segments may be inventoried to match the timing and consumption requirements for assembling 5-layer crane mats of the instant disclosure. In some embodiments, at least approximately 54,000 linear feet of lumber per hour may be planed, primed and stacked in WIP storage.

Turning to FIG. 5A-4, at Step 560a, either a 16 ft or a 18 ft long softwood lumber segment or layer is pulled from WIP storage and loaded onto an in-feed roller on a portion of the manufacturing line that is designated to receive lumber segments having any of these lengths. Similarly, at Step 560b, an 8 ft long softwood lumber segment is pulled from WIP storage and loaded onto in-feed chains on a portion of the manufacturing line that is designated to receive an 8 ft softwood lumber segment. Similarly, at Step 560c, an 8 ft long hardwood lumber segment is pulled from WIP storage and loaded onto in-feed chains on a portion of the manufacturing line that is designated to receive an 8 ft hardwood lumber segment.

At Step 562a, 562b, 562c, lumber segments are vacuum lifted onto either a roller conveyor (14 ft, 16 ft, or 18 ft long softwood lumber segments) or a belt conveyor (8 ft long softwood and hardwood lumber segments) configured to receive the respective lumber segments. For hardwood lumber segments, at Steps 564, 566, and 568 (see FIG. 5A-6), the conveyor conveys the hardwood lumber segments for final dimensional adjustment and entry into a flash dry oven for adjusting the moisture content of the hardwood lumber to a desired range. The flash dry oven allows for the use of hardwood that is not kiln dried. In some embodiments, hardwood lumber segments are heated in the flash dry oven to reduce the moisture content at the surface of the hardwood lumber segments, from over 30% before heating to approximately 7% to approximately 30% after heating, to ensure desired adhesion of respective adjacent lumber segments by an adhesive when positioned therebetween.

At Step 570a, 570b, 570c, the softwood and hardwood lumber segments are conveyed by the respective conveyors to a composition gantry for assembly of the desired crane mat configuration. For hardwood lumber conveyed from the flash dry oven to the composition gantry, moisture content is verified, via one or more sensors, to lie within desired parameters before assembly.

Assembly of a plurality of 5-layer crane mats, for example, begins at Step 572 (see FIG. 5A-7) by vacuum lifting and positioning a plastic divider panel on a glue composition belt conveyor table. The glue composition belt conveyor table is configured to automatically index vertically downward to receive successive lumber or plastic divider panels. The plastic divider panel may be made from high density polyethylene (HDPE) and be configured to be approximately 0.50 inch thick. The plastic divider panel may be sized to slightly exceed the plan form size of the crane mat being manufactured to allow sensors to detect the existence and position of the plastic divider panels. The adhesive described below has been found to resist sticking to the HDPE divider panel, which allows the divider panel to act as a barrier to the adhesive when separating multiple assembled stacks of crane mats following the clamping process described below. At Step 574, after the glue composition belt conveyor table has been indexed downwardly, a first, bottom layer comprising hardwood lumber is then vacuum lifted and positioned on top of the plastic divider panel. At Step 576, a layer of adhesive is applied to desired portions on top of the first, bottom layer of hardwood lumber.

At Step 578 (FIG. 5A-4), after the glue composition belt conveyor table has been indexed downwardly, a first, intermediate layer comprising softwood, such as southern yellow pine, that is either 16 ft or 18 ft long, for example, is then vacuum lifted and positioned on top of the first, bottom layer. At Step 580, a layer of adhesive is applied to desired portions on top of the first, intermediate layer of softwood lumber.

At Step 582 (FIG. 5A-7), after the glue composition belt conveyor table has been indexed downwardly, a middle intermediate layer comprising softwood, such as southern yellow pine, that is 8 ft long is then vacuum lifted and positioned on top of the first, intermediate layer of softwood lumber. At Step 584 (FIG. 5A-7), a layer of adhesive is applied to desired portions on top of the middle intermediate layer of softwood lumber.

At Step 586, after the glue composition belt conveyor table has been indexed downwardly, a second, intermediate layer comprising softwood, such as southern yellow pine, that is either 16 ft or 18 ft long, for example, is then vacuum lifted and positioned on top of the middle intermediate layer. At Step 588, a layer of adhesive is applied to desired portions on top of the second, intermediate layer of softwood lumber.

At Step 590, after the glue composition belt conveyor table has been indexed downwardly, a last, top layer comprising hardwood lumber is then vacuum lifted and positioned on top the second, intermediate layer of softwood lumber. At Step 592, after the glue composition belt conveyor table has been indexed downwardly, a plastic divider panel is vacuum lifted and positioned on top of the last, top layer comprising hardwood lumber. As shown at Step 594, the process of stacking and applying adhesive (ref. Steps 574 through 592) is repeated a total of 5 times. When manufacturing 3-layer mats using system 500, the process of stacking may be repeated a total of 8 times to match the capacity of the presses.

At Step 596, the assembled stack of 5-layer crane mats is transferred to one of three clamping presses, and at Step 598, the stack is pressed and held in compression for approximately 25 minutes or to a desired time to allow the adhesive to set a desired amount. In this embodiment, the three presses are connected to one another and are configured to laterally traverse and index into position so that an available one of the presses receives the assembled stack from the conveyor. The use of three presses allows for matching the assembly of respective stacks of crane mats with the "open time" and with the clamp time of the adhesive.

For purposes of this disclosure, a suitable adhesive is Purbond HB-E102/UR5151 from Henkel Adhesives Corp. This adhesive provides for an "open time" of 10 minutes before the adhesive skins over and before which the assembled stack must be clamped to provide a proper bond. After a stack of crane mats have been assembled, within the 10 minute open time an available one of the three presses traverses laterally into a position to receive the assembled stack. The press then compresses the stack for approximately 25 minutes. While the adhesive in that assembled stack is curing, another assembled stack is being made by system 500. Within the 10 minute open time for the adhesive, another one of the three presses traverses laterally into a position to receive the next assembled stack. The press then compresses the stack for approximately 25 minutes. The process occurs again for a third assembled stack. After a fourth assembled stack of crane mats has been assembled, the adhesive has been cured to a desired state in the first assembled stack. The first assembled stack leaves the first press just in time for the first press to receive the fourth assembled stack. A continuous stream of crane mats may be manufactured in this way. In some embodiments, a total of five 5-layer crane mats 100, together with plastic divider panels positioned therebetween, may be assembled and stacked on top of one another before 9 minutes and 30 seconds elapses. This allows for at least approximately 30 seconds to transfer the assembled stack to one of the available presses and to initiate the compressive force on the stack before the 10 minute "open time" of the adhesive is exceeded.

The clamping presses are further configured to adjust the clamping load according to the size of the assembled stack. For example, if a stack of 14 ft 3-layer mats is received by the press, a computer control system is configured to engage a hydraulic cylinder to apply a predetermined compressive load to the assembled stack. By contrast, if a stack of 16 ft 5-layer crane mats is received by the press, the computer control system is configured to engage a hydraulic cylinder (and possibly a different hydraulic cylinder if the press is equipped with multiple cylinders) to apply a different predetermined compressive load to the assembled stack.

At Step 600, a pressed crane mat stack is conveyed from one of the presses to a de-stacker scissor lift that is configured to automatically index vertically upward, whereupon a de-stacker arm at Step 602 sweeps a plastic divider panel onto a return chain circuit to convey the plastic divider panel at Step 604 back to the composition gantry. At Step 606, after the de-stacker scissor lift has been indexed updwardly, a pressed 5-layer crane mat is moved by the de-stacker arm to the trim and chamfer circuit for final processing. As shown at Step 608, the de-stacking process repeats 5 times (or for as many times as there are pressed crane mats and plastic divider panels to de-stack).

At Steps 610, 612, and 614, each of the pressed, 5-layer crane mats is conveyed to a cross-cut and trim station whereupon the 5-layer crane mat is even-ended, trimmed to a finished length, and chamfered along peripheral edges. At Steps 616, and 618, each of the pressed, 5-layer crane mats is conveyed to a lineal cut and trim station whereupon the 5-layer crane mat is ripped along the centerline to divide the 8 ft×16 ft or 18 ft billet to become two, 4 ft×16 ft or 18 ft crane mats. Additional chamfering of the peripheral edges is completed at this step. The ripping and chamfering in this embodiment are performed by saws that are fixed in position while the crane mats are conveyed past the saws in a pre-programmed fashion.

At Steps 620, 622, and 624, the fully sawn and trimmed 5-layer crane mats are conveyed and transferred via a vacuum lifter to out-feed rollers and stacked until 5 crane mats have been accumulated. At Step 626, the stack of 5 crane mats are gravity fed to an out-feed bump. At Steps 628 and 630, the 5 crane mats are transferred to a paint booth and painted on all 4 exposed sides and ends to protect the end grain of the boards from absorbing moisture. A suitable protectant is Anchorseal® from UC-Coatings, LLC. At Step 532, the sealed set of 5 crane mats may be transferred to inventory for sale. Crane mats 100 made using the systems and methods disclosed herein allow for the bonding together of dissimilar lumber materials, such as hardwood and softwood, and in a continuous stream of production.

One or more aspects of systems 400 and 500 are operable by one or more computers and/or one or more programmable logic controllers (PLC's). The computers and/or PLC's may be coupled with one or more sensors configured for reporting position, measurements, status, and other data regarding elements of systems 400 and 500 and the crane mats being fabricated, and motors, actuators and the like for controlling the operation of one or more aspects of systems 400 and 500. The computers and/or PLC's may be connected to one another and to other computers or devices via a wired or wireless network. These devices may be connected to one or more remote computers and/or web servers via a wired or wireless connection to the Internet.

The computers and one or more PLC's include a processor, such as a central processing unit (CPU), for executing software, particularly software stored in memory or on any computer readable medium, for use by or in connection with any computer related system or method.

A computer readable medium includes any electronic, magnetic, optical, or other physical device or apparatus that can contain or store a computer program for use by or in connection with a computer related system or method. Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by a processor.

The software may include one or more separate programs comprising ordered listings of executable instructions for implementing logical functions. The software stored in memory or on any computer readable medium may include one or more computer programs, each including executable instructions executed by the processor. An operating system may control the execution of other computer programs and can provide scheduling, input-output control, file and data management, memory management, and communication control and related services.

In one embodiment, the PLC may include a computer processor such as a central processing unit (CPU), memory, operating software stored in memory, and various input and output (I/O) devices or data paths. The I/O devices may include input devices, such as a keyboard, mouse, touch screen, and/or any other user interface. The I/O devices may also include output devices, such as a computer display, a modem, a router, serial and parallel wired and wireless communication components and any other elements needed to connect to, for example, another computer or device via a local network or the Internet whether wired or wirelessly. The I/O devices may further include any element or device in a feedback control system for controlling the operation and performance of any aspect of systems 400 and 500.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

The invention claimed is:

1. A crane mat, comprising:
a plurality of panels positioned in alternating transverse directions with respect to one another, each of the panels laminated to an adjacent one of the panels and comprising a plurality of lumber members positioned sided by side, the plurality of lumber members of each panel oriented in either a longitudinal direction or a transverse direction of the crane mat, wherein the plurality of lumber members in a top panel and a bottom panel of the crane mat are oriented in the transverse direction.

2. The crane mat of claim 1, wherein the top and bottom panels include a plurality of spaced apart grooves extending longitudinally from a first longitudinal end of the crane mat to a second longitudinal end of the crane mat for enhancing traction of a vehicle when traversing across the crane mat.

3. The crane mat of claim 1, wherein the plurality of panels comprise a softwood species, a hardwood species, or any combination of the softwood and the hardwood species.

4. The crane mat of claim 1, wherein at least one of the plurality of lumber members in the top and bottom panels comprises the hardwood species, and wherein at least one of the plurality of lumber members in at least one of the panels positioned between the top and bottom panels comprises the softwood species.

5. The crane mat of claim 4, wherein the hardwood species comprises at least one of oak, maple, hickory, and hackberry and the softwood species comprises at least one of spruce, pine, fir, southern yellow pine, and hemlock.

6. The crane mat of claim 1, wherein at least one of the plurality of lumber members in the top and bottom panels and at least one of the plurality of lumber members in at least one of the panels positioned between the top and bottom panels comprises the softwood species.

7. The crane mat of claim 6, wherein the softwood species comprises at least one of spruce, pine, fir, southern yellow pine, and hemlock.

8. The crane mat of claim 1, wherein the plurality of lumber members in at least one of the panels comprises a plurality of different widths of lumber positioned side-by-side.

9. The crane mat of claim 1, wherein at least one of the plurality of lumber members comprises a plurality of wooden members finger jointed together.

10. The crane mat of claim 2, wherein the spaced apart grooves comprise a depth up to at least approximately one half of a thickness of a respective one of the top and bottom panel.

11. A crane mat, comprising:
a plurality of panels including at least a first panel, an intermediate panel, and a third panel, said intermediate panel being adjacent at least one of said first panel and said third panel, each of said first panel, said intermediate panel, and said third panel comprising a plurality of dimensional lumber members arranged side by side and abutting one another, said plurality of dimensional lumber members of each of said first panel and said third panel being arranged lengthwise in a first direction parallel to a direction of travel of a vehicle, and said plurality of dimensional lumber members of said intermediate panel arranged lengthwise in a second direction perpendicular to said first direction; wherein a length of each of said plurality of dimensional lumber members of said first panel and said third panel is equal, said length defining a width of said crane mat; and said crane mat is reversible such that a surface of each of said first panel and said third panel is configured to be selectively usable as a driving surface for said vehicle.

12. The crane mat of claim 11, wherein at least one of the plurality of lumber members in the first and third panels comprise of various hardwood species, and wherein at least one of the plurality of lumber members in the intermediate panel positioned between the first and third panels comprise of various softwood species.

13. The crane mat of claim 12, wherein the hardwood species comprises at least one of oak, maple, hickory, and hackberry and the softwood species comprises at least one of spruce, pine, fir, southern yellow pine, and hemlock.

14. The crane mat of claim 11, wherein at least one of the plurality of lumber members in the first and third panels and at least one of the plurality of lumber members in the intermediate panel positioned between the first and third panels comprises various softwood species.

15. The crane mat of claim 14, wherein the softwood species comprises at least one of spruce, pine, fir, southern yellow pine, and hemlock.

16. The crane mat of claim 11, wherein the plurality of lumber members in at least one of the panels comprises a plurality of different widths of lumber positioned side-by-side.

17. The crane mat of claim 11, wherein at least one of the plurality of lumber members comprises a plurality of wooden members finger jointed together.

18. A crane mat, comprising:

a plurality of panels positioned in alternating transverse directions with respect to one another, each of the panels laminated to an adjacent one of the panels and comprising a plurality of lumber members positioned side by side, the plurality of lumber members of each panel oriented in either a longitudinal direction or a transverse direction of the crane mat, wherein the plurality of lumber members in a top panel and a bottom panel of the crane mat are oriented in the transverse direction; and an edge protector removably positioned along at least a portion of respective longitudinal sides of the crane mat, the edge protector comprising a U-shaped cross section and a plurality of longitudinal protrusions engaging a plurality of grooves in the top and bottom panels, the plurality of grooves positioned longitudinally along a portion of the top and bottom panels.

19. The crane mat of claim 18, wherein at least one of the plurality of lumber members in the first and third panels comprise of various hardwood species, and wherein at least one of the plurality of lumber members in the intermediate panel positioned between the first and third panels comprise of various softwood species.

20. The crane mat of claim 19, wherein the hardwood species comprises at least one of oak, maple, hickory, and hackberry and the softwood species comprises at least one of spruce, pine, fir, southern yellow pine, and hemlock.

21. The crane mat of claim 18, wherein at least one of the plurality of lumber members in the first and third panels and at least one of the plurality of lumber members in the intermediate panel positioned between the first and third panels comprise various softwood species.

22. The crane mat of claim 21, wherein the softwood species comprises at least one of spruce, pine, fir, southern yellow pine, and hemlock.

23. The crane mat of claim 18, wherein the plurality of lumber members in at least one of the panels comprises a plurality of different widths of lumber positioned side-by-side.

24. The crane mat of claim 18, wherein at least one of the plurality of lumber members comprises a plurality of wooden members finger jointed together.

25. The crane mat of claim 18, wherein the edge protector comprises a plastic.

26. The crane mat of claim 18, wherein the edge protector includes a chamfer positioned along top and bottom longitudinal edges.

27. The crane mat of claim 18, wherein each of the longitudinal protrusions include a trapezoidal cross section to ease installation and removal of the edge protector on the top and bottom panels.

* * * * *